United States Patent
Ide et al.

(10) Patent No.: US 9,946,147 B2
(45) Date of Patent: Apr. 17, 2018

(54) TRANSMISSION-TYPE TRANSPARENT SCREEN, IMAGE DISPLAY SYSTEM AND IMAGE DISPLAY METHOD

(71) Applicant: Asahi Glass Company, Limited, Chiyoda-ku (JP)

(72) Inventors: Masamichi Ide, Chiyoda-ku (JP); Yukihiro Tao, Chiyoda-ku (JP); Kenta Sekikawa, Chiyoda-ku (JP); Hitoshi Tsujimura, Chiyoda-ku (JP); Yuriko Kaida, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 15/478,845

(22) Filed: Apr. 4, 2017

(65) Prior Publication Data
US 2017/0205701 A1    Jul. 20, 2017

Related U.S. Application Data

(63) Continuation of application No. PCT/JP2015/080133, filed on Oct. 26, 2015.

(30) Foreign Application Priority Data

Oct. 27, 2014    (JP) ................. 2014-218187

(51) Int. Cl.
*G03B 21/62* (2014.01)
*G02B 5/02* (2006.01)
*G09F 19/18* (2006.01)

(52) U.S. Cl.
CPC ........... *G03B 21/62* (2013.01); *G02B 5/0242* (2013.01); *G02B 5/0278* (2013.01); *G09F 19/18* (2013.01)

(58) Field of Classification Search
None
See application file for complete search history.

(56) References Cited

U.S. PATENT DOCUMENTS

| | | | |
|---|---|---|---|
| 2001/0005282 A1 | 6/2001 | Etori et al. | |
| 2008/0137204 A1* | 6/2008 | Yoshinari | G02B 5/0226 359/599 |

(Continued)

FOREIGN PATENT DOCUMENTS

| | | |
|---|---|---|
| JP | 2000-275738 | 10/2000 |
| JP | 2001-242546 | 9/2001 |

(Continued)

OTHER PUBLICATIONS

International Search Report dated Jan. 26, 2016 in PCT/JP2015/080133, filed on Oct. 26, 2015.

*Primary Examiner* — WB Perkey
(74) *Attorney, Agent, or Firm* — Oblon, McClelland, Maier & Neustadt, L.L.P.

(57) ABSTRACT

To provide a transmission-type transparent screen which is excellent in the see-through property for a scene on the other side of the transparent screen as viewed from an observer in a state where no image-forming light is projected from a projector and which is excellent in visibility of an image displayed on the transparent screen as viewed from the observer in a state where image-forming light is projected from the projector, as well as an image display system and an image display method, employing the transparent screen. A transmission-type transparent screen 1 which has a first surface A and a second surface B on the opposite side thereof and which has a light scattering layer 34 comprising a transparent resin 32 and a light scattering material 33, wherein the light scattering layer 34 further contains a light absorbing material, the haze is from 3 to 30%, the total light (Continued)

transmittance is from 15 to 95%, and the diffuse reflectance is from 0.1 to 2.4%.

17 Claims, 12 Drawing Sheets

(56) References Cited

U.S. PATENT DOCUMENTS

| | | | | |
|---|---|---|---|---|
| 2010/0195313 A1* | 8/2010 | Hiraishi | ............... | G02B 5/0242 |
| | | | | 362/97.1 |
| 2012/0262646 A1* | 10/2012 | Iwata | ................... | G02B 5/0236 |
| | | | | 349/64 |
| 2015/0153639 A1 | 6/2015 | Tokunaga | | |
| 2017/0075207 A1* | 3/2017 | Tao | .......................... | G02B 5/02 |
| 2017/0205701 A1* | 7/2017 | Ide | ......................... | G03B 21/62 |

FOREIGN PATENT DOCUMENTS

| | | |
|---|---|---|
| JP | 2002-6400 | 1/2002 |
| JP | 2004-155985 | 6/2004 |
| JP | 4847329 | 12/2011 |
| JP | 2013-182141 | 9/2013 |
| JP | 2014-106470 | 6/2014 |
| WO | WO 2006/016556 A1 | 2/2006 |
| WO | WO 2013/175129 A1 | 11/2013 |
| WO | WO 2015/186668 A1 | 12/2015 |

* cited by examiner

TRANSMISSION-TYPE TRANSPARENT SCREEN, IMAGE DISPLAY SYSTEM AND IMAGE DISPLAY METHOD

TECHNICAL FIELD

The present invention relates to a transmission-type transparent screen which displays image-forming light projected from a projector so as to be visible as an image to an observer who is on the side opposite to the projector, as well as an image display system and an image display method using the same.

BACKGROUND ART

The following one has been proposed as a transparent member to be used for a showcase for commercial products, etc., a display case for works of art, etc., a window of a building, showroom, vehicle, etc., a glass door, an indoor transparent partition, etc.

An image display transparent member (so called a transparent screen), through which a scene on the opposite side of the transparent member as viewed from an observer's side can be seen, and which displays image-forming light projected from a projector so as to be visible as a screen image to the observer, at the time of transmitting information such as description of commercial products, etc., states of various kinds of equipment, destination guides, messages, etc., to the observer, at the time of displaying operation scenes of various kinds of equipment to the observer, or at the time of making a scene on the opposite side of the transparent member to be not seen through to the observer for the sake of privacy protection, security, etc.

As transparent screens, there are a reflection-type transparent screen which displays image-forming light projected from a projector so as to be visible as a screen image to an observer who is on the same side as the projector; and a transmission-type transparent screen which displays image-forming light projected from a projector so as to be visible as a screen image to an observer who is on the opposite side of the projector.

As a transmission-type transparent screen, for example, as shown in FIG. 17, a transmission-type transparent screen 101 has been proposed which has a light-scattering layer 134 comprising a transparent resin 132 and a light-scattering material 133 (e.g. hollow beads), between a first transparent substrate 110 and a second transparent substrate 120 (see Patent Document 1).

In the transmission-type transparent screen 101, image-forming light L projected from a projector 200 and entered from the surface (first surface A) on the first transparent substrate 110 side, is scattered in the light scattering layer 134 to form an image and displayed so as to be visible as a screen image to an observer X who is on the opposite side of the projector 200.

Further, in the transmission-type transparent screen 101, light of a scene on the first surface A side enters into the transmission-type transparent screen 101 from the first surface A, whereupon a part is scattered in the light scattering layer 134 and the rest is transmitted. Thus, if no image-forming light L is projected on the transmission-type transparent screen 101 from the projector 200, the observer X on the second surface B side can see through the scene of the first surface A side. Likewise, light of a scene on the second surface B side enters into the transmission-type transparent screen 101 from the second surface B, whereupon a part is scattered in the light scattering layer 134 and the rest is transmitted. Thus, if no image-forming light L is projected on the transmission-type transparent screen 101 from the projector 200, an observer on the first surface A side can see through the scene of the second surface B side.

However, in the transmission-type transparent screen 101, as shown in FIG. 18, light L1 of a scene on the first surface A side, light L2 emitted from an illumination 202 (or the sun) on the second surface B side, etc. are scattered in the light scattering layer 134, whereby the entire transmission-type transparent screen 101 may look cloudy. Therefore, even in a state where no image-forming light L is projected on the transmission-type transparent screen 101 from the projector 200, there is a problem such that for the observer X, it is difficult to see through the scene of the other side of the transmission-type transparent screen 101.

Further, even in a state where image-forming light L is projected from the projector 200 to the transmission-type transparent screen 101, unnecessary scattering of light occurs in the light scattering layer 134, whereby there is a problem such that the contrast of the image is lowered, and it is difficult for the observer X to visually recognize the screen image.

PRIOR ART DOCUMENT

Patent Document

Patent Document 1: Japanese Patent No. 4847329

DISCLOSURE OF INVENTION

Technical Problem

The present invention is to provide a transmission-type transparent screen which is excellent in the see-through property for a scene of the other side of the transparent screen as viewed from an observer in such a state that no image-forming light is projected from the projector, and which is excellent in visibility of a screen image displayed on the transparent screen as viewed from the observer in such a state that image-forming light is projected from the projector, as well as an image display system and an image display method using the same.

Solution To Problem

The present invention has the following constructions.

[1] A transmission-type transparent screen which has a first surface and a second surface on the opposite side thereof and which has a light scattering layer comprising a transparent resin and a light scattering material, wherein the light scattering layer further contains a light absorbing material, the haze is from 3 to 30%, the total light transmittance is from 15 to 95%, and the diffuse reflectance is from 0.1 to 2.4%.

[2] The transmission-type transparent screen according to [1], wherein the haze is from 9 to 30%, and the total light transmittance is from 15 to 84%.

[3] The transmission-type transparent screen according to [1] or [2], wherein the proportion of the light absorbing material is from 0.01 to 5 mass % in 100 mass % of the light scattering layer.

[4] The transmission-type transparent screen according to any one of [1] to [3], wherein the transmission-type transparent screen has a laminated structure comprising 1 or 2 layers of transparent substrate and said light scattering layer, and at least one of said first surface and said second surface is a surface of said transparent substrate.

[5] A transmission-type transparent screen which has a first surface and a second surface on the opposite side thereof, which has a light scattering layer comprising a transparent resin and a light scattering material, and which further has a light absorbing layer comprising a transparent material and a light absorbing material, on the second surface side than said light scattering layer, wherein the haze measured with respect to light entered from said first surface side and transmitted to said second surface side, is from 3 to 30%, the total light transmittance measured with respect to light entered from said first surface side and transmitted to said second surface side, is from 15 to 95%, and the diffuse reflectance measured with respect to light entered from said second surface side and reflected to said second surface side, is from 0.1 to 2.4%.

[6] The transmission-type transparent screen according to [5], wherein the haze is from 9 to 30%, and the total light transmittance is from 15 to 84%.

[7] The transmission-type transparent screen according to [5] or [6], wherein the transmission-type transparent screen has a laminated structure comprising 1 or 2 layers of transparent substrate, said light scattering layer and said light absorbing layer, and at least one of said first surface and said second surface is a surface of said transparent substrate.

[8] The transmission-type transparent screen according to any one of [1] to [7], wherein the arithmetic mean roughness Ra at said first surface and said second surface is at most 0.3 μm.

[9] The transmission-type transparent screen according to any one of [1] to [8], wherein the solubility parameter of said transparent resin is at least 18 $(J/cm^3)^{1/2}$.

[10] The transmission-type transparent screen according to any one of [1] to [9], wherein the light scattering material and the light absorbing material are fine particles, and the average primary particle size of the light absorbing material is smaller than the average primary particle size of the light scattering material.

[11] The transmission-type transparent screen according to any one of [1] to [10], wherein the average primary particle size of the light scattering material is at most 1 μm, and the average primary particle size of the light absorbing material is at most 200 nm.

[12] The transmission-type transparent screen according to any one of [1] to [11], wherein the ratio of the average primary particle size of the light absorbing material to the average primary particle size of the light scattering material is (average primary particle size of the light absorbing material)/(average primary particle size of the light scattering material)=from 0.001 to 0.99.

[13] An image display system comprising the transmission-type transparent screen as defined in any one of [1] to [12], and a projector installed on the first surface side of the transmission-type transparent screen.

[14] An image display method which comprises projecting image-forming light from a projector installed on the first surface side of the transmission-type transparent screen as defined in any one of [1] to [12], to the transmission-type transparent screen, to display an image.

[15] A transparent film or sheet which has a light scattering layer made of a transparent resin comprising a light scattering material and a light absorbing material, or has a light scattering layer made of a transparent resin comprising a light scattering material, and a light absorbing layer made of a transparent resin comprising a light absorbing material, and which is to be laminated with a transparent substrate to form a transmission-type transparent screen.

Advantageous Effects of Invention

The transmission-type transparent screen of the present invention is excellent in the see-through property for a scene of the other side of the transparent screen as viewed from an observer in such a state that no image-forming light is projected from the projector, and is excellent in visibility of a screen image displayed on the transparent screen as viewed from the observer in such a state that image-forming light is projected from the projector.

According to the image display system and the image display method of the present invention, in such a state that no image-forming light is projected from the projector, the see-through property for a scene of the other side of the transparent screen as viewed from the observer, is excellent, and in such a state that image-forming light is projected from the projector, visibility of a screen image displayed on the transparent screen as viewed from the observer is excellent.

DESCRIPTION OF EMBODIMENTS

Figure 1:
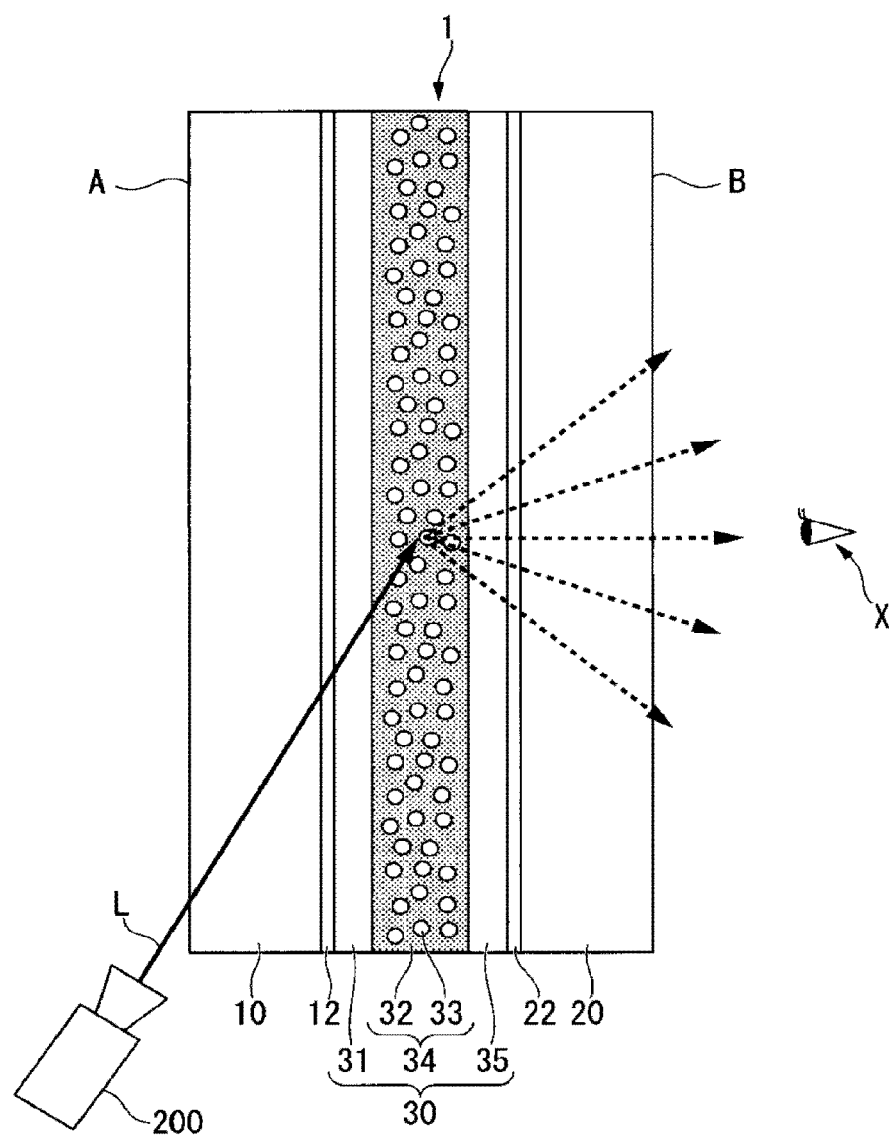
FIG. 1 is a schematic configuration diagram showing an example of the first embodiment of the image display system of the present invention, and a layer diagram showing an example of the first embodiment of the transmission-type transparent screen of the present invention.

The following definitions of terms apply throughout the present specification including claims.

A "first surface" is the outermost surface of a transmission-type transparent screen and means the surface on the side where image-forming light is projected from the projector.

A "second surface" is the outermost surface of a transmission-type transparent screen and means the surface on the side opposite to the first surface.

A "scene on the first surface side (second surface side)" means the image (the main object (commercial product, work of art, person, etc.) and its background, as well as the landscape, etc.) seen on the other side of the transmission-type transparent screen as viewed from an observer who is on the second surface side (first surface side) of the transmission-type transparent screen. In the scene, a screen image displayed on the transmission-type transparent screen, as formed by image-forming light projected from the projector, is not included.

A "bonding layer" is a layer having a function to bond two surfaces and is meant for a layer formed by an adhesive or a pressure sensitive adhesive. In a case where at least one of the two surfaces to be bonded is a surface made of a thermally fusible material and the two surfaces are bonded by the thermal fusion, or in a case where at least one of the two surfaces to be bonded is a surface formed from a cured product of a curable resin material and the two surfaces are bonded together by the curing of the curable resin material, the bonding function is brought about by the surfaces to be bonded themselves, whereby there is no bonding layer.

A "thermally fusible resin" means a thermoplastic resin which softens at a relatively low temperature, showing a bonding property by thermal fusion.

An "arithmetic mean roughness (Ra)" is an arithmetical mean roughness to be measured based on JIS B 0601: 2013 (ISO 4287: 1997, Amd.1: 2009). The standard length lr (cutoff value λc) for roughness curve was set to be 0.8 mm.

A "haze" means the percentage of transmitted light deviated by at least 0.044 rad) (2.5°) from incident light by the front scattering, in light entered from the first surface side (or the second surface side) of a transmission-type transparent screen and transmitted to the second surface side (or the first surface side). That is, it is a usual haze to be measured by the method disclosed in JIS K 7136: 2000 (ISO 14782: 1999). A haze is a value measured in accordance with the above method, at room temperature using a D65 light source of CIE standard prescribed in ISO/CIE10526.

A "total light transmittance" means the proportion (percentage) of the total transmitted light transmitted to the second surface side (or the first surface side), to the incident light entered at an incident angle of 0° from the first surface side (or the second surface side) of a transmission-type transparent screen. That is, it is a usual total light transmittance to be measured by the method disclosed in JIS K 7361: 1997 (ISO 13468-1: 1996) and is a value measured by using a D65 light source.

A "diffuse reflectance" means the proportion (percentage) of reflected light deviated by at least 0.044 rad (2.5°) from positive light reflected to the first surface side (or the second surface side), to the incident light entered at an angle of 0° from the first surface side (or the second surface side) of a transmission-type transparent screen. At the time of measuring the diffuse reflectance, in order to prevent entering of light to the transmission-type transparent screen from the second surface side (or the first surface side) opposite to the first surface side (or the second surface side) to be measured, the opposite side surface is covered with a blackout curtain. Further, an aperture with approximately the same size as the size of the incident light is set to be in contact with the object to be measured.

A diffuse reflectance and a refractive index are values measured at room temperature by using d-line (wavelength 589 nm) of a sodium lamp.

A "solubility parameter" (hereinafter referred to also as SP value) is a value defined by the regular solution theory introduced by Hildebrand. Here, the SP value of a transparent resin is, in a case where the transparent resin is a thermoplastic resin, meant for the SP value of the thermoplastic resin, and in a case where the transparent resin is a cured product of a curable resin, meant for the SP value of the curable resin before being cured.

First Embodiment

<Image Display System>

FIG. 1 is a schematic configuration diagram showing an example of the first embodiment of the image display system of the present invention.

The image display system comprises a transmission-type transparent screen 1 (hereinafter referred to also as screen 1) and a projector 200 disposed in the space on the first surface A side of the screen 1.

<Transmission-Type Transparent Screen>

The first embodiment of the of the present invention is a transmission-type transparent screen which has a first surface and a second surface on the opposite side thereof, so that a scene on the first surface side can be seen through to an observer on the second surface side and a scene on the second surface side can be seen through to an observer on the first surface side, and which displays image-forming light projected from the first surface side, so as to be visible as a screen image to an observer on the second surface side, and it has a light scattering layer comprising a transparent resin, a light scattering material and a light absorbing material.

FIG. 1 is a layer diagram showing an example of the first embodiment of the transmission-type transparent screen of the present invention.

A screen 1 is one having a light scattering sheet 30 disposed between a first transparent substrate 10 and a second transparent substrate 20.

The first transparent substrate 10 and the light scattering sheet 30 are bonded by a bonding layer 12, and the second transparent substrate 20 and the light scattering sheet 30 are bonded by a bonding layer 22.

(Transparent Substrates)

The material for the first transparent substrate 10 and the second transparent substrate 20 (hereinafter collectively referred to also as a transparent substrate) may, for example, be glass, a transparent resin, etc. The materials for the respective transparent substrates may be the same or may be different.

As the glass constituting the transparent substrate, soda lime glass, alkali-free glass, borosilicate glass, aluminosilicate glass, etc. may be mentioned. A transparent substrate made of glass may also be subjected to chemical strengthening, physical strengthening, hard coating, etc. in order to improve the durability.

As the transparent resin constituting the transparent substrate, a cured product of a curable resin, or a thermoplastic resin may be mentioned, and a thermoplastic resin is preferred. The thermoplastic resin may, for example, be a polycarbonate, a thermoplastic polyester (polyethylene terephthalate, polyethylene naphthalate, etc.), triacetyl cellulose, a cycloolefin polymer, polymethyl methacrylate, an ethylene-tetrafluoroethylene copolymer (ETFE), etc., and from the viewpoint of weatherability and transparency, a polycarbonate, a thermoplastic polyester or a cycloolefin polymer is preferred.

As the transparent substrate, one having no birefringence is preferred.

The thickness of the transparent substrate may be such a thickness that the durability as the substrate is thereby maintained. The thickness of the transparent substrate may, for example, be at least 0.01 mm, may be at least 0.05 mm, or may be at least 0.1 mm. The thickness of the transparent substrate may, for example, be at most 10 mm, may be at most 5 mm, may be at most 0.5 mm, may be at most 0.3 mm, or may be at most 0.15 mm.

The arithmetic mean roughness Ra of the surface (first surface A) of the first transparent substrate 10 and the surface (second surface B) of the second transparent substrate 20, is preferably at most 0.3 μm, more preferably at most 0.05 μm, and in a case where the surface of the transparent substrate 10 is the outermost layer, it is further preferably at most 0.01 μm. When the arithmetic mean roughness Ra is at most 0.3 μm, image-forming light L projected from the projector 200 is less likely to be scattered at the first surface A and the second surface B, and thus is less likely to form an image at the first surface A and the second surface B. As a result, it is possible to suppress formation of double images. The arithmetic mean roughness Ra of the surface (first surface A) of the first transparent substrate 10 and the surface (second surface B) of the second transparent substrate 20, is preferably low from the viewpoint of the inspection and transparency, but from the viewpoint of the production efficiency and costs, it may be at least 0.001 μm.

Here, even in a case where the outermost layer of the transmission-type transparent screen is not a transparent substrate (e.g. in the case of a transparent film, a light scattering layer, a light absorbing layer or the like), the preferred range of the arithmetic mean roughness Ra at the first surface and the second surface of the transmission-type transparent screen, is similar to the case where the outermost layer is a transparent substrate. By doing so, there is an effect to suppress an increase of the haze due to a difference in refractive index between the bonding layer and the substrate.

(Bonding Layers)

The bonding layer 12 and the bonding layer 22 (hereinafter collectively referred to also as a bonding layer) are layers formed from an adhesive or pressure-sensitive adhesive. The adhesive or pressure-sensitive adhesive may be a liquid containing a solvent. In the case of the liquid containing a solvent, it is employed for bonding or adhesion by applying it to at least one of bonding surfaces, followed by removal of the solvent. In the case of an adhesive comprising a pressure-sensitive adhesive or thermally fusible resin, its sheet or film may be used.

In the case of an adhesive made of a curable resin, a bonding layer 12 is formed by curing the curable resin between a transparent substrate 10 and a transparent film 31. In the case of an adhesive made of a thermally fusible resin, a bonding layer 12 is formed by heat-softening the thermally fusible resin, followed by cooling, between a transparent substrate 10 and a transparent film 31. In the case of a pressure sensitive adhesive, a bonding layer 12 is formed by press-bonding a layer of the pressure sensitive adhesive between a transparent substrate 10 and a transparent film 31.

The material for the adhesive may, for example, be a thermally fusible resin, a photocurable resin, a thermosetting resin, etc., and the pressure-sensitive adhesive may, for example, be an acrylic adhesive, a silicone-type adhesive, etc. The materials for the respective bonding layers may be the same or may be different.

The thermally fusible resin may, for example, be an ethylene-vinyl acetate copolymer, polyvinyl butyral, plasticized polyvinyl acetal, plasticized polyvinyl chloride, plasticized thermoplastic polyester, thermoplastic polyurethane, an ethylene-ethyl acrylate copolymer, etc.

The photocurable resin may, for example, be an acrylic photo-curable resin, a photo-curable epoxy resin, etc., and the thermosetting resin may, for example, be an acrylic thermosetting resin, a thermosetting epoxy resin, a polyurethane curable resin, etc.

The thickness of the bonding layer may be any thickness so long as functions as a bonding layer are maintained, and it is, for example, preferably from 0.01 to 1.5 mm, more preferably from 0.05 to 1 mm.

(Light Scattering Sheet)

The light scattering sheet 30 comprises a first transparent film 31; a second transparent film 35; and a light scattering layer 34 provided between the first transparent film 31 and the second transparent film 35 and having a light scattering material 33 and a light absorbing material (reference numeral is omitted) dispersed in a transparent resin 32.

(Transparent Films)

The first transparent film 31 and the second transparent film 35 (hereinafter collectively referred to also as a transparent film) may be resin films or may be thin glass films. The materials for the respective transparent films may be the same or may be different.

The transparent resin constituting a transparent film may, for example, be a polycarbonate, a thermoplastic polyester, triacetyl cellulose, a cycloolefin polymer, polymethyl methacrylate, etc.

The thickness of the transparent film is preferably a thickness whereby a roll-to-roll process is applicable, and it is, for example, preferably from 0.01 to 0.5 mm, more preferably from 0.05 to 0.3 mm, further preferably at most 0.2 mm.

(Light Scattering Layer)

The light scattering layer 34 comprises a transparent resin 32, a light scattering material 33 and a light absorbing material.

As the transparent resin 32, a cured product of a photocurable resin (a photocurable acrylic resin, a photo-curable epoxy resin, etc.), a cured product of a thermosetting resin (a thermosetting acrylic resin, a thermosetting epoxy resin, etc.), or a thermoplastic resin (a polycarbonate, a thermoplastic polyester, triacetyl cellulose, a cycloolefin polymer, polymethyl methacrylate, etc. as well as a polyolefin resin, a thermoplastic polyimide resin, a thermoplastic urethane, an ionomer resin, an ethylene-vinyl acetate copolymer, polyvinyl butyral, ETFE, a thermoplastic silicone, etc.), is preferred. The yellow index of the transparent resin is preferably at most 10, more preferably at most 5, from the viewpoint of maintaining transparency so that the function as a window in the screen 1 is not impaired.

The photocurable resin is a composition comprising a relatively low molecular weight curable compound and a photopolymerization initiator or a curing agent to be activated by light, and it will be cured by irradiation with light such as ultraviolet ray to become a solid cured resin. The thermosetting resin is a composition comprising a relatively low molecular weight curable compound and a thermal polymerization initiator or a curing agent, and it will be cured by heating to become a solid cured resin. For example, a curable acrylic resin is a composition comprising a curable compound having one or more acryloyloxy groups or methacryloyloxy groups and a polymerization initiator which generates radicals by light or heat.

The solubility parameter of the curable resin which becomes the transparent resin 32, is preferably at least 18 $(J/cm^3)^{1/2}$, more preferably at least 20 $(J/cm^3)^{1/2}$. When the solubility parameter of the curable resin which becomes the transparent resin 32, is at least 18 $(J/cm^3)^{1/2}$, it becomes easy to disperse the light scattering material 33 and the light absorbing material in the transparent resin 32, without applying surface treatment to the light scattering material 33 and the light-absorbing material. Further, since it is not necessary to apply surface treatment to the light scattering material 33 and the light absorbing material, it is possible to keep costs low. The solubility parameter of the curable resin which becomes the transparent resin 32, is preferably at most 40 $(J/cm^3)^{1/2}$ from the viewpoint of storage stability under high humidity.

The light scattering material 33 may, for example, be fine particles of high-refractive-index material such as titanium oxide (refractive index: 2.5 to 2.7), zirconium oxide (refractive index: 2.4), aluminum oxide (refractive index: 1.76), zinc oxide (refractive index: 2.0), barium sulfate (refractive index: 1.64), zinc sulfide (refractive index: 2.2), etc.; fine particles of low refractive index material such as porous silica (refractive index: at most 1.3), hollow silica (refractive index: at most 1.3); a resin material having a different refractive index with low compatibility with the transparent resin 32; a crystallized resin material of at most 1 μm, etc. The light scattering material is a material that has a function to scatter light, as it has a refractive index different from the resin material which becomes a binder. Most of the resin materials have a refractive index of from 1.45 to 1.65, and therefore, it is preferred that the refractive index is different by at least 0.15, more preferably by at least 0.25, further preferably by at least 0.5, from such resin materials. Therefore, the refractive index of the light scattering material may suitably be at least 1.6, preferably at least 1.7, more preferably at least 1.95. Further, the light scattering material may suitably have a refractive index of at most 1.5, preferably at most 1.4, and it is further preferred that in a part of the light scattering material, voids of at least 1 nm which can be regarded to have a refractive index of from 1.1 to 1.0, are contained. As the light scattering material 33, from the viewpoint of a high refractive index, titanium oxide or zirconium oxide is particularly preferred.

The proportion of the light scattering material 33 is preferably from 0.01 to 5 mass %, more preferably from 0.1 to 2 mass %, in 100 mass % of the light scattering layer 34. In order to adjust the total light transmittance of the light scattering layer 34 to be high, the proportion of the light scattering material 33 is preferably from 0.01 to 0.1 mass % in 100 mass % of the light scattering layer 34. In the case of the same primary particle size, as the amount of the light scattering material is large, the haze tends to be high, but within this range, the haze can easily be adjusted to be within a preferred range.

In a case where the light scattering material 33 is fine particles, the average primary particle size of the fine particles is preferably from 0.02 to 1 μm. Further, particle sizes of dispersed fine particles may be primary particles or may be secondary particles, and such particle sizes are preferably from 0.02 to 1 μm, more preferably from 0.03 to 0.8 μm, further preferably from 0.15 to 0.6 μm. If the average particle size in the dispersed state of the light scattering material 33 is comparable with or slightly smaller than the wavelength of light to be scattered, the probability of being scattered forwardly will be increased, and a function to scatter incident light without letting it refract, becomes stronger. Here, "comparable with or slightly smaller than the wavelength of light to be scattered" is meant to be from about the same to about ¹⁄₁₀ of the wavelength of light to be scattered. As a result, distortion (white blurring) of the scene seen on the other side of the screen 1 as viewed from the observer side, is suppressed, and there will be no rapid change in the amount of light, whereby the see-through property for the scene will be improved. In the case of the same content, the smaller the average primary particle size, the higher the transmittance tends to be. Further, the smaller the average primary particle size of the light scattering material 33, the more bluish the color appearance of the transmission-type transparent screen tends to be and the higher the transparency tends to be felt.

The light absorbing material includes, as an inorganic coloring material, a carbon-type material (carbon black, nano-diamond, fullerene, carbon nanotube, carbon nanohorn, grapheme, etc.), titanium black, black silica, and fine particulate material containing mainly silver (e.g. silver nitride, sulfide and oxide), etc. Further, as an organic coloring material, organic pigments, organic dyes, etc. may be mentioned. Two or more of light absorbing materials may be mixed to adjust the color. From the viewpoint of durability, it is preferred to use an inorganic coloring material, or an organic pigment as a light absorbing material. The light absorbing material is to absorb light that is scattered and propagated by the light scattering material in the plane direction of the substrate, and thus plays a role to prevent light from being emitted from a region not irradiated with light by a projector. The contrast of the image is thereby enhanced. Further, by such an action, even if light enters from an illumination usually disposed upward, it is possible to suppress light from being emitted from the transparent screen member by multiple scattering and thus play a role of improving the transparency. Further, when the average primary particle size is small, in the case of the same material and the same volume concentration, the total light transmittance tends to be low. The inorganic coloring material and the organic coloring material are usually particulate.

The proportion of the light absorbing material is preferably from 0.01 to 5 mass %, more preferably from 0.1 to 2 mass %, in 100 mass % of the light scattering layer 34. Further, as the optical density, it is preferably adjusted in conjunction with the film thickness of the transparent resin so as to be between 0.05 to 1. In order to adjust the haze of the transmission-type transparent screen to be low and the total light transmittance to be high, the proportion of the light absorbing material is preferably from 0.01 to 0.5 mass % in 100 mass % of the light scattering layer 34.

The particle size of the light absorbing material is preferably as small as possible. Specifically, in a case where the light absorbing material is fine particles, the average primary particle size of the fine particles is preferably from 1 to 200 nm, more preferably from 1 to 100 nm, further preferably from 1 to 60 nm. Further, the average primary particle size of the light absorbing material is preferably at most the average primary particle size of the light scattering material. The ratio of the average primary particle size of the light absorbing material to the average primary particle size of the light scattering material (average primary particle size of the light absorbing material/average primary particle size of the light scattering material) is preferably from 0.001 to 1. When the average primary particle size of the light absorbing material/average primary particle size of the light scattering material is within the above range, it is possible to efficiently take out light in the forward scattering direction and to increase the screen gain while maintaining the transparency.

From such a viewpoint that it is easy to obtain a balance of the haze, the total light transmittance and the transparency, the light absorbing material is preferably a carbon-type material and titanium black, more preferably carbon black and titanium black.

The thickness of the light scattering layer 34 is preferably from 1 to 200 μm. When the thickness of the light scattering layer 34 is at least 1 μm, the effect of light scattering can be sufficiently exhibited. When the thickness of the light scattering layer 34 is at most 200 μm, it tends to be easy to form the light scattering layer 34 by a roll-to-roll process. Further, in a case where the surface of the light scattering layer 34 is not the outermost layer of the transmission-type transparent screen, the surface of the light scattering layer 34 may be flat, or may have irregularities, so long as Ra is at most 10 μm. As the irregularities, random irregularities without periodicity are preferred. The shape of the irregularities may be a similarity shape. In the case of having irregularities, it is possible to control scattering properties of the light scattering layer 34 by two factors i.e. the irregularities and the light scattering material.

(Method for Producing Light Scattering Sheet)

The light scattering sheet 30 can be produced, for example, by the following procedure.

A paste comprising a photocurable resin, a light scattering material 33 and a light absorbing material, is prepared.

The paste is applied to the surface of a first transparent film 31, and on the paste, a second transparent film 35 is overlaid.

The paste is irradiated with light (ultraviolet rays) from the side of the first transparent film 31 or from the side of the second transparent film 35, to cure the photocurable resin, thereby to form a light scattering layer 34 having a light scattering material 33 and a light absorbing material dispersed in the transparent resin 32, to obtain a light scattering sheet 30.

The light scattering sheet 30 can also be prepared by the following procedure.

A solution comprising a solvent, a thermally fusible resin, a light scattering material 33 and a light absorbing material, is prepared.

The solution is applied on the surface of a first transparent film 31 and dried, then, a second transparent film 35 is overlaid, and then, the thermally fusible resin is heated and softened, followed by cooling to obtain a light scattering sheet 30.

The light scattering sheet 30 can also be prepared by the following procedure.

A thermoplastic resin, a light scattering material 33 and a light absorbing material are extrusion-molded to form a light scattering layer 34. For example, a light scattering sheet 30 is obtained by a three-layer extrusion molding, together with the thermoplastic resin for forming transparent films 31, 35. The light scattering layer may be formed by using a master batch method. That is, in advance, the thermoplastic resin, the light scattering material and the light absorbing material are melt-kneaded to produce a master batch, and at the time of extrusion molding, the master batch and the thermoplastic resin may be melt-kneaded and extruded to form a light scattering layer.

(Method for Producing Transmission-Type Transparent Screen)

A screen 1 is produced by laminating the light scattering sheet 30 and the transparent substrates 10 and 20 via the bonding layers 12 and 22. Bonding of the light scattering sheet 30 and the transparent substrate 10, and bonding of the light scattering sheet 30 and the transparent substrate 20, may be carried out at the same time, or may be carried out sequentially. For example, if the bonding layer is made of a cured product of a curable resin, a curable resin layer is formed between the surface of the transparent substrate 10 and the surface of the transparent film 31, as a bonding surface of the light scattering sheet 30, and the curable resin is cured for bonding. Bonding of the surface of the transparent film 35 and the surface of the transparent substrate 20 can be conducted in the same manner. If the bonding layer is made of a thermally fusible resin, a thermally fusible resin layer may be formed between the transparent film surface of the light scattering sheet and the surface of the transparent substrate, and the thermally fusible resin layer is heat-pressed and fused, followed by cooling for bonding. In a case where the bonding layer is a pressure-sensitive adhesive resin, a pressure sensitive adhesive layer is formed between the transparent film surface of the light scattering sheet and the surface of the transparent substrate, and the pressure-sensitive adhesive layer is pressed for bonding.

(Optical Characteristics of Transmission-Type Transparent Screen)

The haze of the screen 1 is from 3 to 30%, preferably from 9 to 30%, more preferably from 12 to 26%, further preferably from 15 to 26%. When the haze is at least 3%, preferably at least 9%, it is possible to secure the screen gain and viewing angle. When the haze is at most 30%, it is possible to prevent such a phenomenon that the entire screen 1 appears to be cloudy. As a result, the contrast of a scene which is seen on the other side of the screen 1 as viewed from the observer X side, will be improved, and the see-through property for the scene will be improved. Further, the contrast of the image displayed on the screen 1 will be improved, whereby the visibility of the image will be improved. The haze of the screen 1 is measured with respect to light which has entered from the first surface A side and passed through to the second surface B side.

The haze of the screen 1 can be adjusted to be within the above range by adjusting the concentration of the light scattering material 33, by adjusting the thickness of the light scattering layer 34 containing the light scattering material 33, or by adjusting the type of the light-absorbing material.

When the concentration of the light scattering material 33 is made low, or the average primary particle size of the light-absorbing material is made small, the haze tends to be small.

The total light transmittance of the screen 1 is from 15 to 95%, preferably from 15 to 84%, more preferably from 37 to 71%, further preferably from 40 to 65%. When the total light transmittance is at least 15%, the see-through property for the scene seen on the other side of the screen 1 as viewed from the observer X side will be excellent. When the total light transmittance is at most 95%, preferably at most 84%, unnecessary scattered light is sufficiently absorbed by the light absorbing material, whereby such a phenomenon that the entire screen 1 appears to be cloudy, can be suppressed. As a result, the contrast of the scene seen on the other side of the screen 1 as viewed from the observer X side will be improved, thereby to improve the see-through property for the scene. Further, the contrast of the image displayed on the screen 1 will be improved, thereby to improve the visibility of the image. The total light transmittance of the screen 1 is measured with respect to light entered from the first surface A side and passed through to the second surface B side.

The total light transmittance of the screen 1 can be adjusted to be within the above range mainly by adjusting the concentration of the light absorbing material, by adjusting the thickness of the layer containing the light-absorbing material, or by adjusting the type of the light-absorbing material. Further, it can also be adjusted by adjusting the type, particle size and agglomerated state of the light scattering material.

The diffuse reflectance of the screen 1 is from 0.1 to 2.4%, preferably from 0.1 to 2.4%, more preferably from 0.1 to 1.7%. When the diffuse reflectance is at least 0.1%, it is possible to secure the screen gain and viewing angle, and when it is at least 1.0%, such is more preferred from the viewpoint of the screen gain and viewing angle. When the diffuse reflectance is at most 2.4%, unnecessary scattered light is sufficiently absorbed by the light absorbing material, whereby such a phenomenon that the entire screen 1 appears to be cloudy, can be suppressed. As a result, the contrast of the scene seen on the other side of the screen 1 as viewed from the observer X side, will be improved, whereby the see-through property for the scene will be improved. Further, the contrast of the image displayed on the screen 1 will be improved, whereby the visibility of the image will be improved. The diffuse reflectance of the screen 1 is measured with respect to light entered from the second surface B side and reflected to the second surface B side.

The diffuse reflectance of the screen 1 can be adjusted to be within the above range by e.g. adjusting the concentration of the light scattering material 33, by adjusting the thickness of the light scattering layer 34 containing the light scattering material 33, by adjusting the concentration of the light absorbing material, by adjusting the thickness of the layer containing the light absorbing material, or by forming e.g. an antireflection film.

With respect to the optical properties of the screen 1, when the concentration of the light scattering material 33 is made low, and the average primary particle size of the light-absorbing material is selected to be small, the visibility will be good even at a low haze, and when the ambient illumination is low, the visibility will be further improved. Specifically, when the concentration of the light scattering material 33 is made to be a concentration of from 0.01 to 1 mass % in 100 mass % of the light scattering layer 34, and the average primary particle size of the light-absorbing material is made to be from 1 to 60 nm, it is possible to obtain a screen, of which the haze is from 3 to 15% and the total light transmittance is from 70 to 95%. The average primary particle size of the light scattering material of said light scattering layer 34 may be from 0.02 to 1 μm, and the concentration of the above light absorbing material may be from 0.01 to 5 mass % in 100 mass % of the light scattering layer 34. Such a screen can be made to function as a window with high transparency e.g. during a time zone where illumination is high, and can be made to function as a screen, e.g. during a time zone where illumination is low.

The difference in refractive index between adjacent layers in the screen 1 is, from such a viewpoint that the reflectance at each layer interface can be suppressed to be within 0.5%, preferably within 0.2, and from such a viewpoint that the reflectance of each layer interface can be made to be about 0.1%, more preferably within 0.1.

<Projector>

A projector 200 may be any so long as it is capable of projecting image-forming light L on the screen 1. The projector 200 may be a known projector. As the projector, a short focal projector is preferred, since it is capable of projecting image-forming light L from a close range of from 10 to 90 cm, and thus making it possible to attain space saving of the image display system, and is capable of projecting image-forming light L at a large incident angle, whereby it is less likely that a person traverses between the projector 200 and the screen 1.

<Image Display Method>

In the screen 1, as shown in FIG. 1, image-forming light L projected from the projector 200 and entered from the first surface A of the screen 1, is scattered in the light scattering layer 34 to form an image, which is displayed to be visible as a screen image to the observer X who is on the side opposite to the projector 200.

Light of the scene on the first surface A side is, after entering from the first surface A into the screen 1, partially scattered in the light scattering layer 34, and the rest passes through. As a result, in a case where no image-forming light L is projected to the screen 1 from the projector 200, the observer X on the second surface B side can see through the scene of the first surface A side. Likewise, light of the scene on the second surface B side is, after entering from the second surface B into the screen 1, partially scattered in the light scattering layer 34, and the rest passes through. As a result, in a case where no image-forming light L is projected from the projector 200 on the screen 1, an observer on the first surface A side can see through the scene of the second surface B side.

Figure 2:
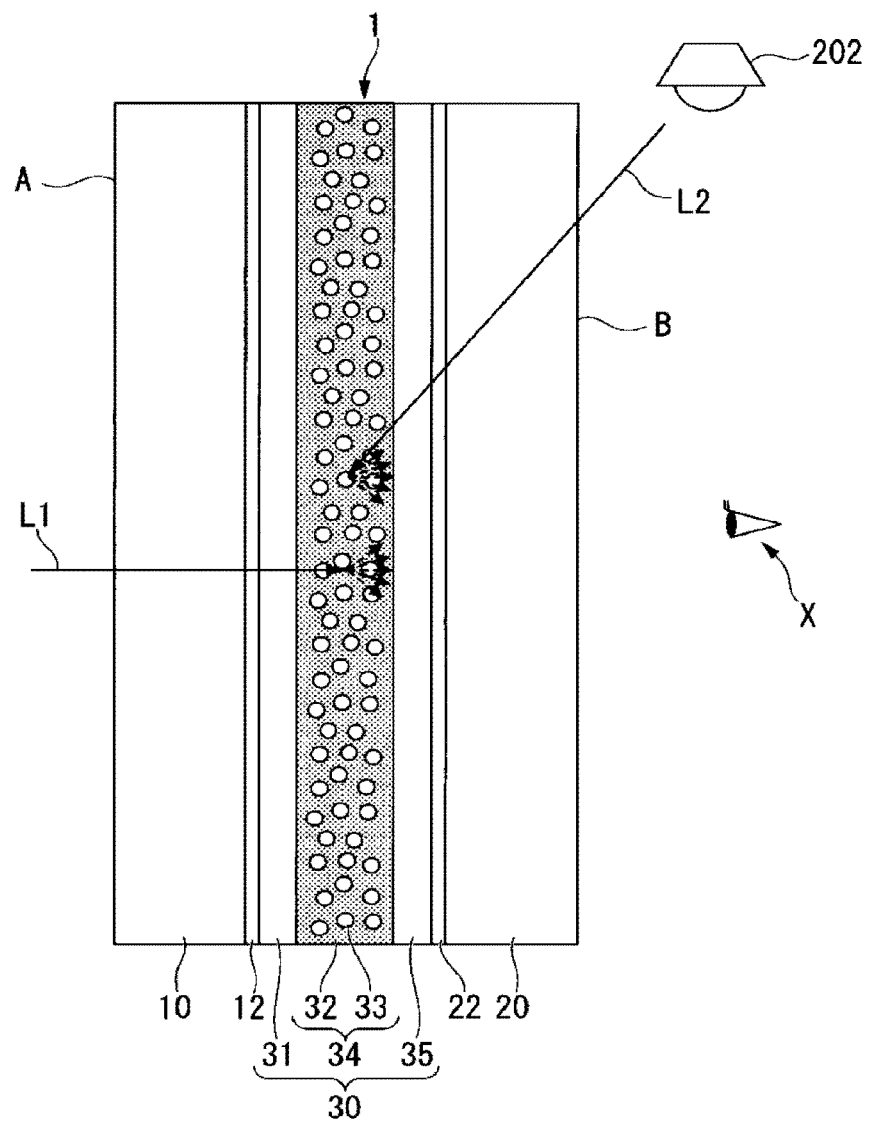
FIG. 2 is a view showing a state where, in the image display system in FIG. 1, no image-forming light is projected to the transmission-type transparent screen from the projector.

Further, in the screen 1, as shown in FIG. 2, light L1 of the scene on the first surface A side, light L2 emitted from an illumination 202 (or the sun) on the second surface B side, etc. will be scattered in the light scattering layer 34. However, the light scattering layer 34 contains a light absorbing material, whereby unwanted scattered light will be absorbed by the light absorbing material, and such a phenomenon that the entire screen 1 appears to be cloudy, can be suppressed.

Therefore, in a case where no image-forming light L is projected on the screen 1 from the projector 200, it will be easy for the observer X to see through the scene of the other side of the screen 1.

Further, even in a state where image-forming light L is projected from the projector 200 on the screen 1, unnecessary scattered light is absorbed by the light absorbing material, whereby decrease in the contrast of the image is suppressed, and it will to be easy for the observer X to view the image.

<Action Mechanism>

In the screen 1 as described above, the light scattering layer 34 contains a light-absorbing material, whereby unnecessary scattered light is absorbed by the light absorbing material, and such a phenomenon that the entire screen 1 appears to be cloudy, is suppressed. Specifically, the haze of the screen 1 will be from 3 to 30%, the total light transmittance will be from 15 to 95%, and the diffuse reflectance will be from 0.1 to 2.4%. And, when the haze, total light transmittance and diffuse reflectance of the screen 1, satisfy the above ranges at the same time, in a state where no image-forming light L is projected from the projector 200, the see-through property for the scene on the other side of the screen 1 as viewed from the observer X will be excellent, and in a state where an image-forming light L is projected from the projector 200, the visibility of an image displayed on the screen 1 as viewed from the observer X will be excellent. Especially in the case where an environment of 100 lux or more by external light is present in the line of sight of the observer X, it is easy to obtain the above effect.

OTHER EMBODIMENTS

The first embodiment of the screen of the present invention may be a screen having a first surface and a second surface on the opposite side thereof, and having a light scattering layer comprising a transparent resin and light scattering material, wherein the light scattering layer further contains a light absorbing material, the haze is from 3 to 30%, the total light transmittance is from 15 to 95%, and the diffuse reflectance is from 0.1 to 2.4%, and is not limited to only the screen 1 in FIG. 1. Hereinafter, the same structures as in the screen 1 in FIG. 1 will be represented by the same reference numerals, and the description thereof will be omitted.

Figure 3:
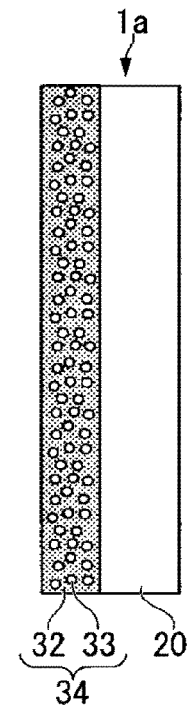
FIG. 3 is a layer diagram showing another example of the first embodiment of the transmission-type transparent screen of the present invention.

As shown in FIG. 3, the first embodiment of the transmission-type transparent screen may be a screen 1a having a light scattering layer 34 formed on the surface of a second transparent substrate 20. In a case where the transparent resin 32 is a cured product of a curable resin, it may be produced by forming a layer of an uncured curable resin composition which becomes a light scattering layer 34 on one surface of the second transparent substrate 20, and curing the curable resin composition on the second transparent substrate 20. Whereas, in a case where the transparent resin 32 is a thermoplastic resin, it can be produced by e.g. a method of producing a film which becomes a light scattering layer 34 by e.g. extrusion molding from a thermoplastic resin composition which becomes a light scattering layer 34, and laminating the film and a second transparent substrate 20, followed by thermal fusion, and in a case where the transparent resin 32 and the transparent substrate 20 are thermoplastic resins, it can be produced by a method of subjecting a thermoplastic resin composition which becomes a light scattering layer 34, and a thermoplastic resin which becomes a transparent substrate 20, to two-layer extrusion molding.

Figure 4:
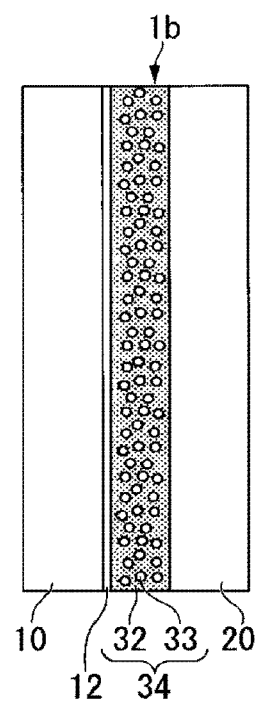
FIG. 4 is a layer diagram showing another example of the first embodiment of the transmission-type transparent screen of the present invention.

Further, as shown in FIG. 4, it may be a screen 1b formed by bonding a first transparent substrate 10, via a bonding layer 12, on the surface on the light scattering layer 34 side of the screen 1a. The screen 1b shown in FIG. 4 may, for example, be prepared by bonding the screen 1a shown in FIG. 3 and the second transparent substrate 10 by an adhesive or a pressure-sensitive adhesive. For example, the screen 1b can be prepared by laminating the screen 1a shown in FIG. 3 and the second transparent substrate 10 via a thermally fusible resin film sandwiched therebetween, and heat-pressing the laminate to form a bonding layer 12.

Figure 5:
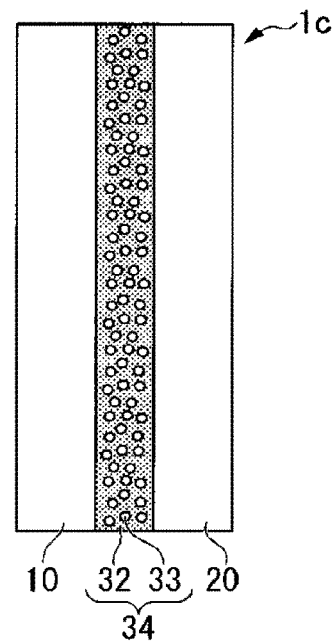
FIG. 5 is a layer diagram showing another example of the first embodiment of the transmission-type transparent screen of the present invention.

The first embodiment of the transmission-type transparent screen may be, as shown in FIG. 5, a screen 1c obtained by bonding the first transparent substrate 10 and the second transparent substrate 20 via the light scattering layer 34 using a bonding material as a transparent resin 32.

The screen 1c may, for example, be produced by filling an uncured curable resin composition which becomes a light scattering layer 34 between the transparent substrate 10 and the second transparent substrate 20 and then curing the curable resin composition. Further, in a case where the transparent resin 32 is a thermally fusible resin such as polyvinyl butyral, it can be produced by producing a sheet which becomes a light scattering layer 34, e.g. by extrusion molding from a thermoplastic resin composition which becomes a light scattering layer 34, and sandwiching the obtained sheet between the transparent substrate 10 and the second transparent substrate 20 made of a transparent substrate (such as a glass plate) made of a material having no or low thermal fusibility, followed by heat-pressing for fusion bonding.

Furthermore, it can also be produced by three-layer extrusion molding from a thermoplastic resin which becomes a transparent substrate 10, and a thermoplastic resin composition which becomes a light scattering layer 34.

Figure 6:
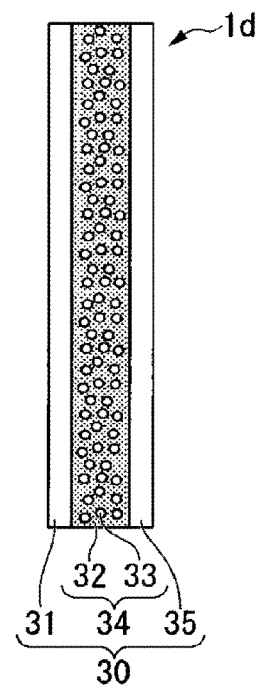
FIG. 6 is a layer diagram showing another example of the first embodiment of the transmission-type transparent screen of the present invention.

The first embodiment of the transmission-type transparent screen may be, as shown in FIG. 6, a screen 1d having the first transparent substrate 10 and the second transparent substrate 20 omitted, i.e. a light scattering sheet 30 itself. In this case, the surface of the first transparent film 31 becomes the first surface, and the surface of the second transparent film 35 becomes the second face. Further, although not shown, a film or sheet composed solely of the light scattering layer 34 may be made to be the transmission-type transparent screen.

Figure 7:
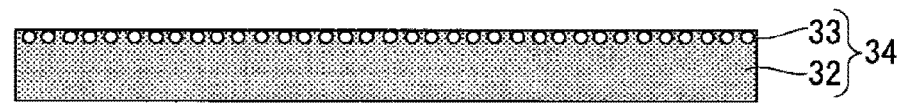
FIG. 7 is a diagram showing another example of a light scattering layer in the first embodiment of the transmission-type transparent screen of the present invention.
Figure 8:
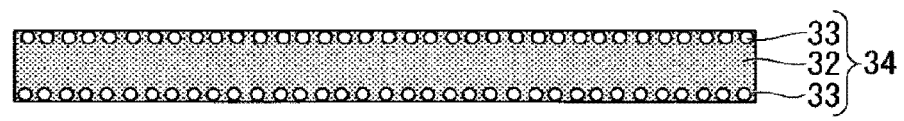
FIG. 8 is a diagram showing another example of a light scattering layer in the first embodiment of the transmission-type transparent screen of the present invention.

The light scattering layer 34 may be, as shown in FIG. 7, one wherein the light scattering material 33 is localized in the vicinity of the first surface of the light scattering layer 34, or may be, as shown in FIG. 8, one wherein the light scattering material 33 is localized in the vicinity of the first surface and second surface of the light scattering layer 34. The light scattering layer 34 wherein the light scattering material 33 is localized in the vicinity of the surface of the light scattering layer 34 is expected to improve the resolution of the image. The light scattering layer 34 wherein the light scattering material 33 is localized in the vicinity of the surface of the light scattering layer 34 can, for example, be formed by selecting, as a photocurable resin and a light scattering material 33, ones which will be readily phase-separated, and letting the photocurable resin the light scattering material 33 undergo phase separation at the time when a paste containing the photocurable resin, the light scattering material 33 and a light absorbing material, is applied to e.g. a transparent film. Here, one that undergoes phase separation may be the light absorbing material.

In the first embodiment of the transmission-type transparent screen, image-forming light from the projector may be projected to the second transparent substrate side (or the second transparent film side). In this case, the surface of the second transparent substrate side (or the second transparent film side) becomes the first surface A.

A film or sheet composed solely of the light scattering layer, or a film or sheet having a transparent layer formed on one surface or both surfaces of the light scattering layer (e.g. a sheet of the structure shown in FIG. 6), is capable of forming a transmission-type transparent screen, by bonding it to e.g. an existing window glass by using an adhesive or a pressure-sensitive adhesive. Further, one relatively thin among them is deformable and is suitable for forming a transmission-type transparent screen having a curved surface.

Further, in double glazing having two glass plates and a frame-like spacer interposed between peripheral edges of the glass plates so as to form a void space between the glass plates, on the inner surface of one of the glass plates, a film or sheet composed solely of a light scattering layer may be bonded to form a transmission-type transparent screen.

The present invention is also a sheet or film having a light scattering layer to form such a transmission-type transparent screen. The sheet or film may be laminated with a transparent substrate to form a transmission-type transparent screen of the present invention.

For example, a film consisting solely of the light scattering layer 34 is produced by peeling off the transparent films 31 and 35 from the sheet of the structure shown in FIG. 6, and two transparent substrates are overlaid on both surfaces of this film via thermally fusible resin films, to produce a laminate having a structure of the transparent substrate/heat-fusible resin layer/light scattering layer 34/heat-fusible resin layer/transparent substrate, followed by heat-pressing the laminate to produce a transmission-type transparent screen of the present invention having a structure of the transparent substrate 10/bonding layer 12/light scattering layer 34/bonding layer 22/transparent substrate 20.

Second Embodiment

<Image Display System>

FIG. 2 is a schematic structural view showing an example of the second embodiment of the image display system of the present invention.

The image display system comprises a transmission-type transparent screen 2 (hereinafter referred to also as a screen 2) and a projection 200 disposed in the space on the first surface A side of the screen 2.

<Transmission-Type Transparent Screen>

The second embodiment of the transmission-type transparent screen of the present invention is a transmission-type transparent screen which has a first surface and a second surface on the opposite side thereof, which permits the scene on the first surface side to be seen through to an observer on the second surface side and permits the scene on the second surface side to be seen through to an observer on the first surface side, and which displays image-forming light projected from the first surface side so as to be visible as a screen image to an observer on the second surface side, and it has a light scattering layer comprising a transparent resin and a light scattering material, and a light absorbing layer comprising a transparent material and a light absorbing material, provided on the second surface side than the light scattering layer.

Figure 9:
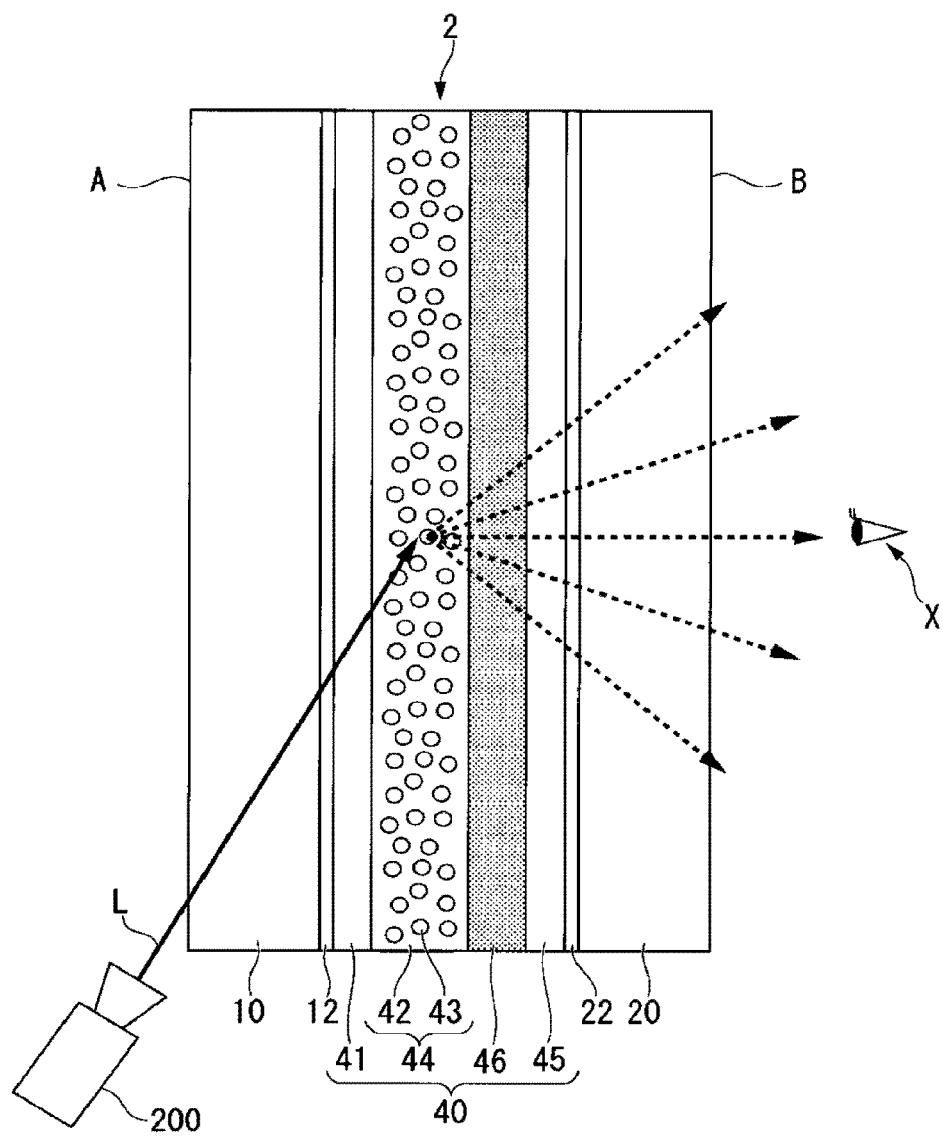
FIG. 9 is a schematic configuration diagram showing an example of the second embodiment of the image display system of the present invention, and a layer diagram showing an example of the second embodiment of the transmission-type transparent screen of the present invention.

FIG. 9 is a layer diagram showing an example of the second embodiment of the transmission-type transparent screen of the present invention. Hereinafter, the components having the same structures as in the screen 1 in FIG. 1 will be identified by the same reference numerals, and the description thereof will be omitted.

The screen 2 is one having a light scattering sheet 40 disposed between the first transparent substrate 10 and the second transparent substrate 20.

The first transparent substrate 10 and the light scattering sheet 40 are bonded by a bonding layer 12, and the second transparent substrate 20 and the light scattering sheet 40 are bonded by a bonding layer 22.

(Light Scattering Sheet)

The light scattering sheet 40 comprises a first transparent film 41; a second transparent film 45; a light scattering layer 44 provided between the first transparent film 41 and the second transparent film 45, and having a light scattering material 43 dispersed in a transparent resin 42; and a light-absorbing layer 46 provided between the light scattering layer 44 and the second transparent film 45, and having a light-absorbing material (reference numeral omitted) dispersed in a transparent resin (reference numeral omitted).

(Transparent Films)

The first transparent film 41 and the second transparent film 45 (hereinafter collectively referred to also as a transparent film) may be a resin film, or may be a thin glass film. Materials for the respective transparent films may be the same or may be different.

As the transparent films, those similar to the transparent films of the light scattering sheet 30 as described above, may be used.

(Light Scattering Layer)

The light scattering layer 44 comprises a transparent resin 42 and a light scattering material 43, and it does not contain a light absorbing material.

As the transparent resin 42, one similar to the transparent resin 32 of the light scattering sheet 30 as described above may be used.

As the light scattering material 43, one similar to the light scattering material 33 of the light scattering sheet 30 as described above may be used.

The proportion of the light scattering material 43 is preferably from 0.01 to 5.0 mass %, more preferably from 0.1 to 1.0 mass %, in 100 mass % of the light scattering layer 44.

The thickness of the light scattering layer 44 is preferably from 1 to 200 µm. When the thickness of the light scattering layer 44 is at least 1 µm, the effect of light scattering can be sufficiently exhibited. When the thickness of the light scattering layer 44 is at most 200 µm, it becomes easy to form the light scattering layer 44 by a roll-to-roll process.

(Light Absorbing Layer)

The light absorbing layer 46 comprises a transparent resin and a light absorbing material, and does not contain the light scattering material 43.

As the transparent resin of the light absorbing layer 46, one similar to the transparent resin 32 of the light scattering sheet 30 as described above, may be used. Further, in the second embodiment of the present invention, the matrix component of the light absorbing layer may be any transparent material and is not limited to the transparent resin. As the transparent material, in addition to the transparent resin, glass, etc. may be mentioned.

As the light absorbing material, one similar to the light absorbing material of the light scattering sheet 30 as described above, may be used.

The proportion of light absorbing material is preferably from 0.01 to 5.0 mass %, more preferably from 0.1 to 2.0 mass %, in 100 mass % of the light absorbing layer 46.

The thickness of the light absorbing layer 46 is preferably from 1 to 200 µm. When the thickness of the light absorbing layer 46 is at least 1 µm, the effect of light absorption can be sufficiently exhibited. When the thickness of the light absorbing layer 46 is at most 200 µm, it becomes easy to form the light absorbing layer 46 by a roll-to-roll process.

Further, the light absorbing layer 46 may be an inorganic thin film or an organic thin film containing no matrix component. As a material of the inorganic thin film, a metal such as Cr, Mo, Ti, Ta, NiCr or Zn, an oxide or nitride of Cr, Mo or Ta, or a carbon material such as graphene, may be mentioned.

(Method for Producing Light Scattering Sheet)

The light scattering sheet 40 may, for example, be produced by the following procedure.

A first paste comprising a photocurable resin and a light scattering material 33 is prepared.

A second paste comprising a photocurable resin and a light absorbing material is prepared.

The first paste is applied to the surface of the first transparent film 41, and the first paste is irradiated with light (ultraviolet rays) to cure the photocurable resin thereby to form a light scattering layer 44 having the light scattering material 33 dispersed in the transparent resin 32.

The second paste is applied to the surface of the light scattering layer 44, and a second transparent film 45 is overlaid on top of the second paste.

Light (ultraviolet rays) is applied to the second paste from the side of the first transparent film 41 or from the side of the second transparent film 45, to cure the photocurable resin, thereby to form a light absorbing layer 46 having a light absorbing material dispersed in the transparent resin.

Using a thermosetting resin instead of the photo-curable resin, and curing the thermosetting resin by heating in place of the light irradiation, it is possible to produce a light scattering sheet 40 in the same manner as described above. Further, using a thermoplastic resin instead of the photocurable resin, films constituting the respective layers are produced by extrusion molding, and by laminating such films, it is possible to produce a light scattering sheet 40. Further, a light scattering sheet 40 can be produced also by multilayer extrusion molding using thermoplastic resins.

(Method for Producing Transmission-Type Transparent Screen)

By using the above light scattering sheet 40 in place of the light scattering sheet 30 in the first embodiment, it is possible to produce a screen 2 by the same method as the production method of the transmission-type transparent screen in the first embodiment.

(Optical Characteristics of Transmission-Type Transparent Screen)

The haze of the screen 2 is from 3 to 30%, preferably from 9 to 30%, more preferably from 12 to 26%, further preferably from 15 to 26%. When the haze is at least 3%, more preferably at least 9%, it is possible to secure the screen gain and viewing angle. When the haze is at most 30%, such a phenomenon that the entire transmission-type transparent screen 2 appears to be cloudy, can be suppressed. As a result, the contrast of the scene seen on the other side of the screen 2 as viewed from the observer X side, will be improved, whereby the see-through property for the scene will be improved. Further, the contrast of the image displayed on the screen 2 will be improved, whereby the image visibility will be improved. The haze of the screen 2 is measured with respect to light entered from the first surface A side and transmitted to the second surface B side.

The haze of the screen 2 can be adjusted to be within the above range by e.g. adjusting the concentration of the light scattering material 43, adjusting the thickness of the light scattering layer 44 containing the light scattering material 43, or adjusting the type of the light-absorbing material contained in the light absorbing layer 46. The haze tends to be small when the concentration of the light scattering material 43 is made low, or when the average primary particle size of the light-absorbing material is made small.

The total light transmittance of the screen 2 is from 15 to 95%, preferably from 15 to 84%, more preferably from 37 to 71%, further preferably from 40 to 65%. When the total light transmittance is at least 15%, the see-through property for the scene which is seen on the other side of the screen 2 as viewed from the observer X side will be excellent. When the total light transmittance is at most 95%, preferably at most 84%, unnecessary scattered light is sufficiently absorbed by the light absorbing material, and such a phenomenon that the entire screen 2 appears to be cloudy, can be suppressed. As a result, the contrast of the scene which is seen on the other side of the screen 2 as viewed from the observer X side, will be improved, whereby the see-through property for the scene will be improved. Further, the contrast of the image displayed on the screen 2 will be improved, whereby the image visibility will be improved. The total light transmittance of the screen 2 is measured with respect to light entered from the first surface A side and transmitted to the second surface B side. The total light transmittance of the screen 2 can be adjusted to be within the above range mainly by adjusting the concentration of the light absorbing material, adjusting the layer thickness of the light-absorbing material layer, or adjusting the type of the light-absorbing material. Further, it can also be adjusted by adjusting the type, particle size and agglomerated state, of the light scattering material.

The diffuse reflectance of the screen 2 is from 0.1 to 2.4%, preferably from 0.1 to 2.4%, more preferably from 0.1 to 1.7%. When the diffuse reflectance is at least 0.1%, it is possible to secure the screen gain and viewing angle, and when it is at least 1.0%, such is more preferred from the viewpoint of the screen gain and viewing angle. When the diffuse reflectance is at most 2.4%, unnecessary scattered light is sufficiently absorbed by the light absorbing material, and such a phenomenon that the entire screen 2 appears to be cloudy, can be suppressed. As a result, the contrast of the scene which is seen on the other side of the screen 2 as viewed from the observer X side, will be improved, whereby the see-through property for the scene will be improved. Further, the contrast of the image displayed on the screen 2 will be improved, whereby the image visibility will be improved. The diffuse reflectance of the screen 2 is measured with respect to light entered from the second surface B side and reflected to the second surface B side.

With respect to the optical properties of the screen 2, if the concentration of the light scattering material 43 contained in the light scattering layer 44 is made low, and one having a small average primary particle size is selected as the light absorbing material contained in the light absorbing layer, the visibility will be good even at a low haze, and if the ambient illuminance is low, the visibility will be further excellent. Specifically, when the concentration of the light scattering material 43 is made to be a concentration of from 0.01 to 0.5 mass % in 100 mass % of the light scattering layer 44, and the average primary particle size of the light absorbing material is made to be from 1 to 100 nm, it is possible to obtain a screen having a haze of from 3 to 15% and a total light transmittance of from 70 to 95%. The average primary particle diameter of the light scattering material of said light scattering layer 44 may be from 0.02 to 1 μm, and the concentration of the light absorbing material may be from 0.01 to 5 mass % in 100 mass % of the light absorbing layer. Such a screen can be made to function as a window having a high transparency during the time zone where illuminance is high, and to function as a screen during the time zone where illuminance is low.

The difference in refractive index between adjacent layers in the screen 2 is, from such a viewpoint that the reflectance at each layer interface can be suppressed to be within 0.5%, preferably within 0.2, and from such a viewpoint that the reflectance at each layer interface can be made to be about 0.1%, more preferably within 0.1.

<Image Display Method>

In the screen 2, as shown in FIG. 9, image-forming light L projected from the projector 200 and entered from the first surface A of the screen 2, is scattered in the light scattering layer 44 to form an image, which is displayed so as to be visible as a screen image to an observer X who is on the opposite side of the projector 200.

Light of the scene on the first surface A side, after entering into the screen 2 from the first surface A, is partially scattered in the light scattering layer 44, and the rest passes through. As a result, in a case where no image-forming light L is projected to screen 2 from the projector 200, the observer X on the second surface B side can see through the scene of the first surface A side. Likewise, light of the scene on the second surface B, after entering from the second surface B into the screen 2, is partly scattered in the light scattering layer 44, and the rest passes through. As a result, in a case where no image-forming light L is projected from the projector 200 to the screen, the observer on the first surface A side can see through the scene of the second surface B side.

Figure 10:
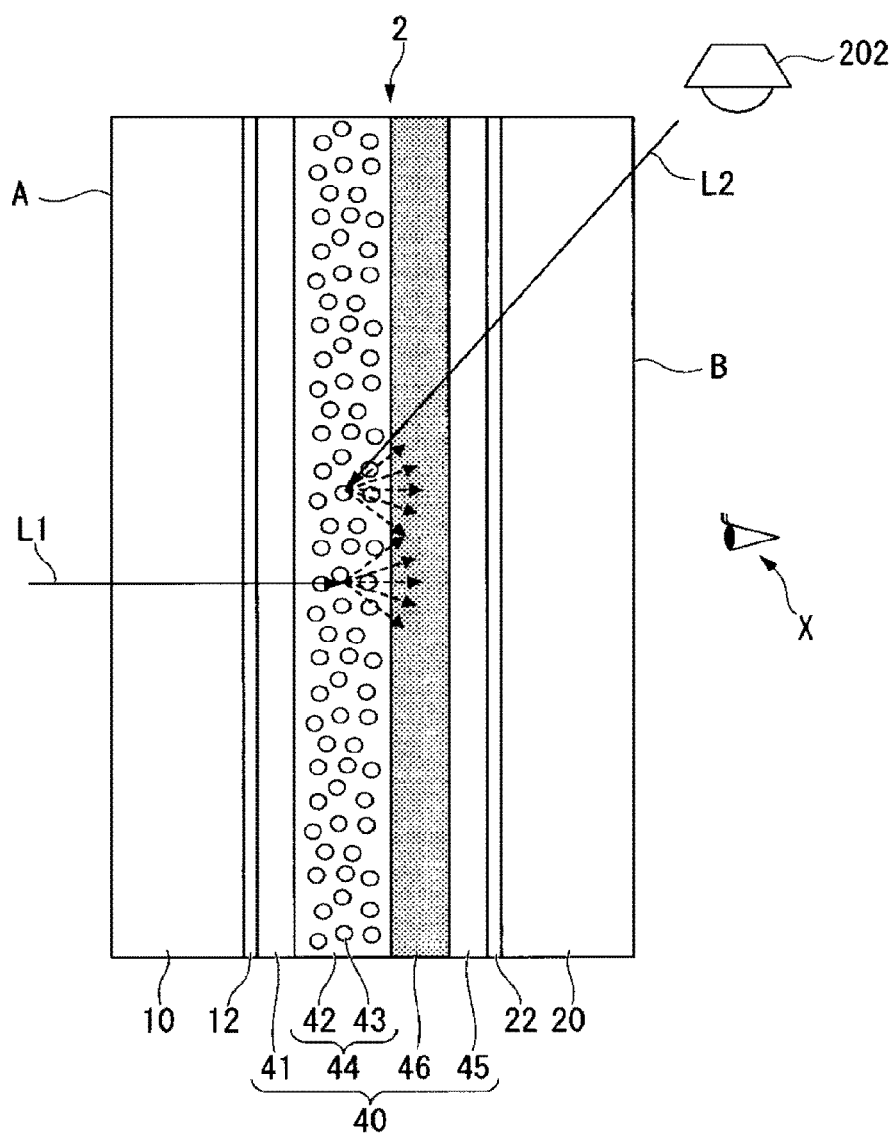
FIG. 10 is a diagram showing a state where, in the image display system in FIG. 9, no image-forming light is projected to the transmission-type transparent screen from the projector.

Here, in the screen 2, as shown in FIG. 10, light L1 of the scene on the first surface A side, light L2 irradiated from an illumination 202 (or the sun) on the second surface B side, etc. are scattered in the light scattering layer 44. However, since the light absorbing layer 46 provided on the second surface B side than the light scattering layer 44 contains a light-absorbing material, unwanted scattered light will be absorbed by the light-absorbing material, whereby such a phenomenon that the entire screen 2 appears to be cloudy can be suppressed.

Therefore, in a state where no image-forming light L is projected on the screen 2 from the projector 200, it becomes easy for the observer X to see through the scene of the other side of the screen 2.

Further, even in a state where image-forming light L is projected from the projector 200 to the screen 2, since unnecessary scattered light is absorbed by the light-absorbing material, lowering of the image contrast is suppressed, and it becomes easy for the observer X to view the screen image.

<Action Mechanism>

In the screen 2 as described above, since the light absorbing layer 46 provided on the second surface B side than the light scattering layer 44 contains a light absorbing material, unnecessary scattered light generated in the layer 44 is absorbed by the light absorbing material, whereby such a phenomenon that the entire screen 2 appears to be cloudy, can be suppressed. Specifically, the haze of the screen 2 will be from 3 to 30%, the total light transmittance will be from 15 to 95%, and the diffuse reflectance will be from 0.1 to 2.4%. When the haze, total light transmittance and diffuse reflectance, of the screen 2, satisfy the above ranges at the same time, in a state where no image-forming light L is projected from the projector 200, the see-though property for the scene of the other side of the screen 2 as viewed from the observer X will be excellent, and in a state where image-forming light L is projected from the projector 200, the visibility of the image displayed on the screen 2 as viewed from the observer X will be excellent. Especially in a case where an environment of at least 100 lux by an external light is present in the visual line of the observer X, it is easy to obtain the above effect.

OTHER EMBODIMENTS

The second embodiment of the transmission-type transparent screen of the present invention is not limited to the screen in FIG. 9, so long as it is a transmission-type transparent screen having the first surface and the second surface on the opposite side thereof, and having the light scattering layer containing a light scattering material, and it further has a light absorbing layer comprising a transparent resin and a light absorbing material on the second surface side than the light scattering layer, wherein the haze measured with respect to light entered from the first surface side and transmitted to the second surface side is from 3 to 30%, the total light transmittance measured with respect to light entered from the first surface side and transmitted to the second surface side is from 15 to 95%, and the diffuse reflectance measured with respect to light entered from the second surface side and reflected to the second surface side is from 0.1 to 2.4%. Hereinafter, components having the same structures as in the screen 2 in FIG. 9 will be identified by the same reference numerals, and the description thereof will be omitted.

Figure 11:
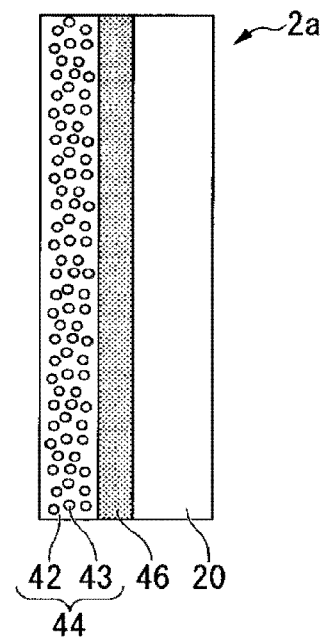
FIG. 11 is a layer diagram showing another example of the second embodiment of the transmission-type transparent screen of the present invention.

The second embodiment of the transmission-type transparent screen may be, as shown in FIG. 11, a screen 2a having a light absorbing layer 46 and a light scattering layer 44 sequentially formed on the surface of the second transparent substrate 20.

Figure 12:
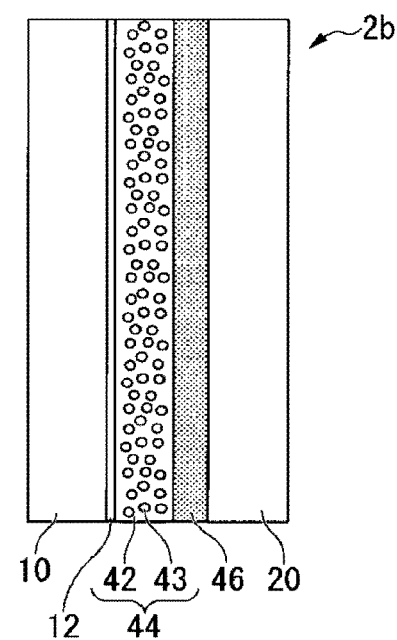
FIG. 12 is a layer diagram showing another example of the second embodiment of the transmission-type transparent screen of the present invention.

Further, as shown in FIG. 12, it may be a screen 2b wherein a transparent substrate 10 is bonded via a bonding layer 12 on the surface on the light scattering layer 44 side of the screen 2a.

Figure 13:
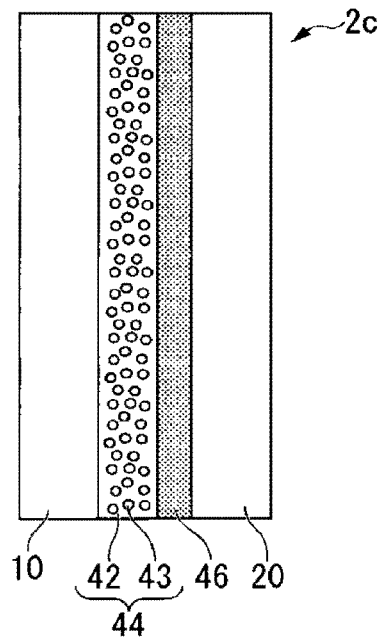
FIG. 13 is a layer diagram showing another example of the second embodiment of the transmission-type transparent screen of the present invention.

The second embodiment of the transmission-type transparent screen may be, as shown in FIG. 13, a screen 2c wherein the first transparent substrate 10 and the second transparent substrate 20 are bonded via a light scattering layer 44 and a light absorbing layer 46 using bonding materials as transparent resins.

Figure 14:
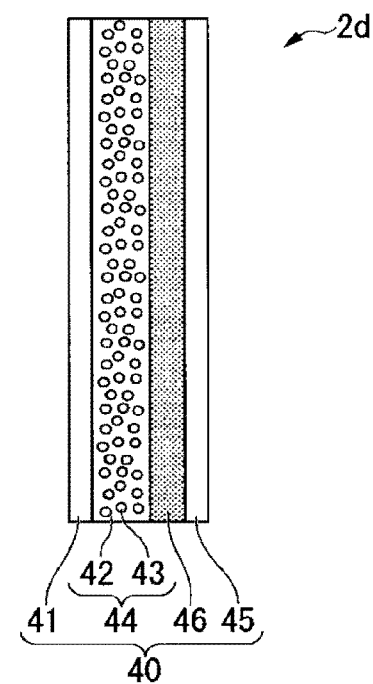
FIG. 14 is a layer diagram showing another example of the second embodiment of the transmission-type transparent screen of the present invention.

The second embodiment of the transmission-type transparent screen may be, as shown in FIG. 14, a screen 2d having the first transparent substrate 10 and the second transparent substrate 20 omitted, i.e. the light scattering sheet 40 itself.

Figure 15:
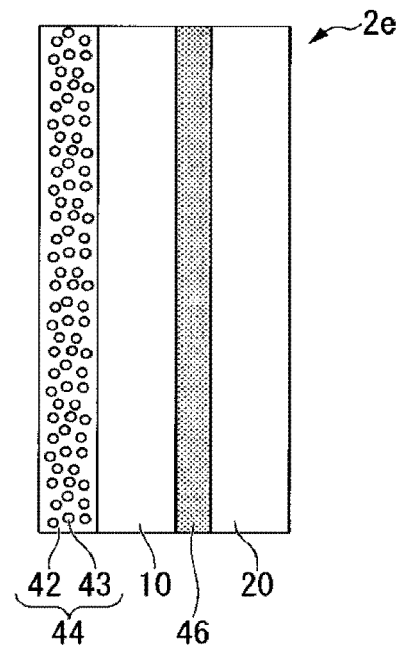
FIG. 15 is a layer diagram showing another example of the second embodiment of the transmission-type transparent screen of the present invention.

The second embodiment of the transmission-type transparent screen may be, as shown in FIG. 15, a screen 2e wherein a light scattering layer 44 is formed on the first surface side of a laminated glass having the first transparent substrate 10 and the second transparent substrate 20 laminated via a light absorbing layer 46 using a bonding material as a transparent resin. Like the screen 2e, even if other layers are present between the light scattering layer 44 and the light absorbing layer 46, when the light absorbing layer 46 is present on the second surface side of the light scattering layer 44, it is possible to exhibit the effect of the present invention.

Figure 16:
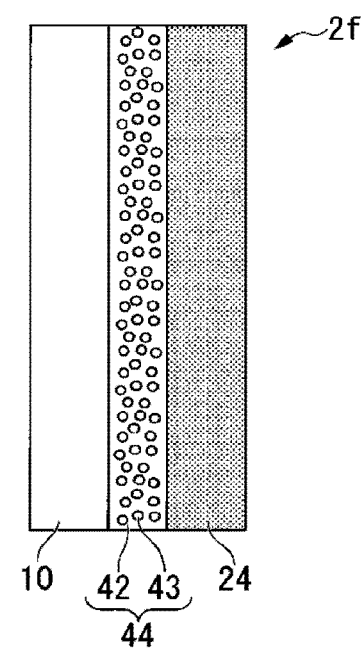
FIG. 16 is a layer diagram showing another example of the second embodiment of the transmission-type transparent screen of the present invention.
Figure 17:
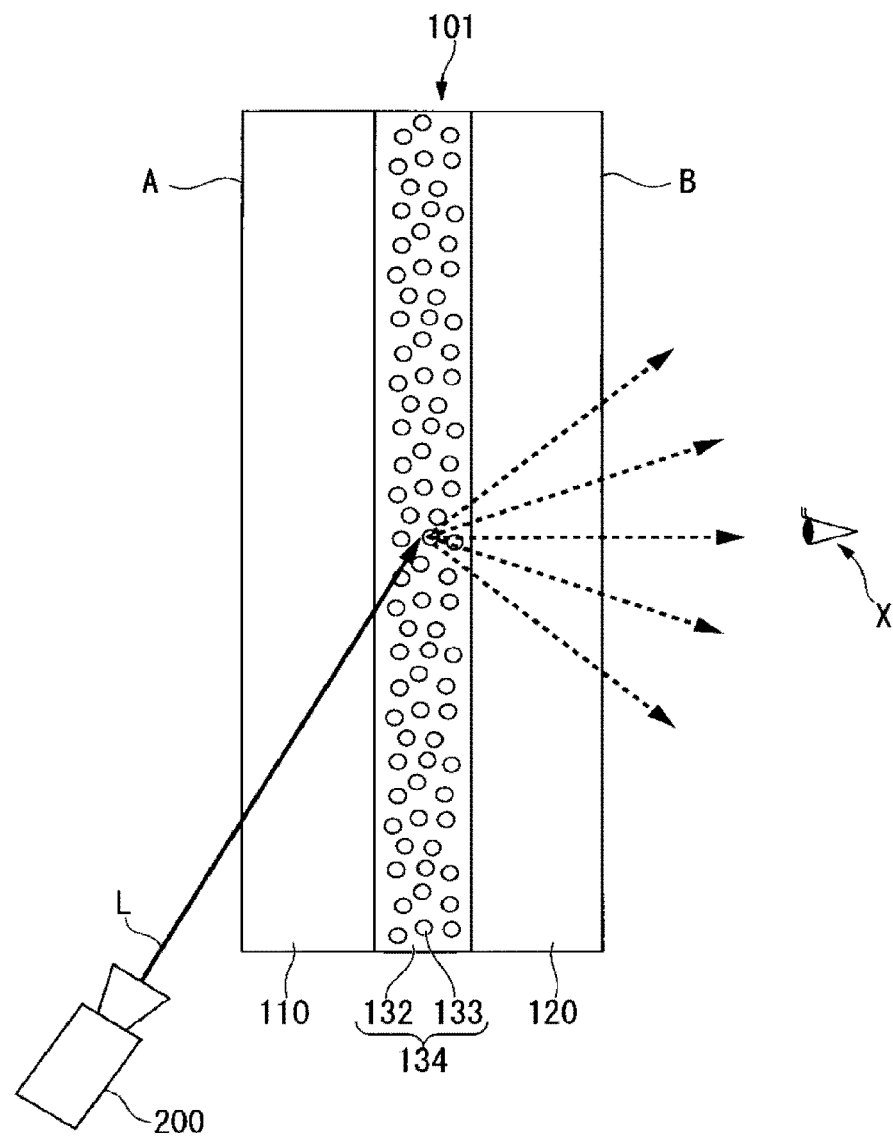
FIG. 17 is a schematic configuration view showing an example of the conventional image display system, and a layer diagram showing an example of the conventional transmission-type transparent screen.
Figure 18:
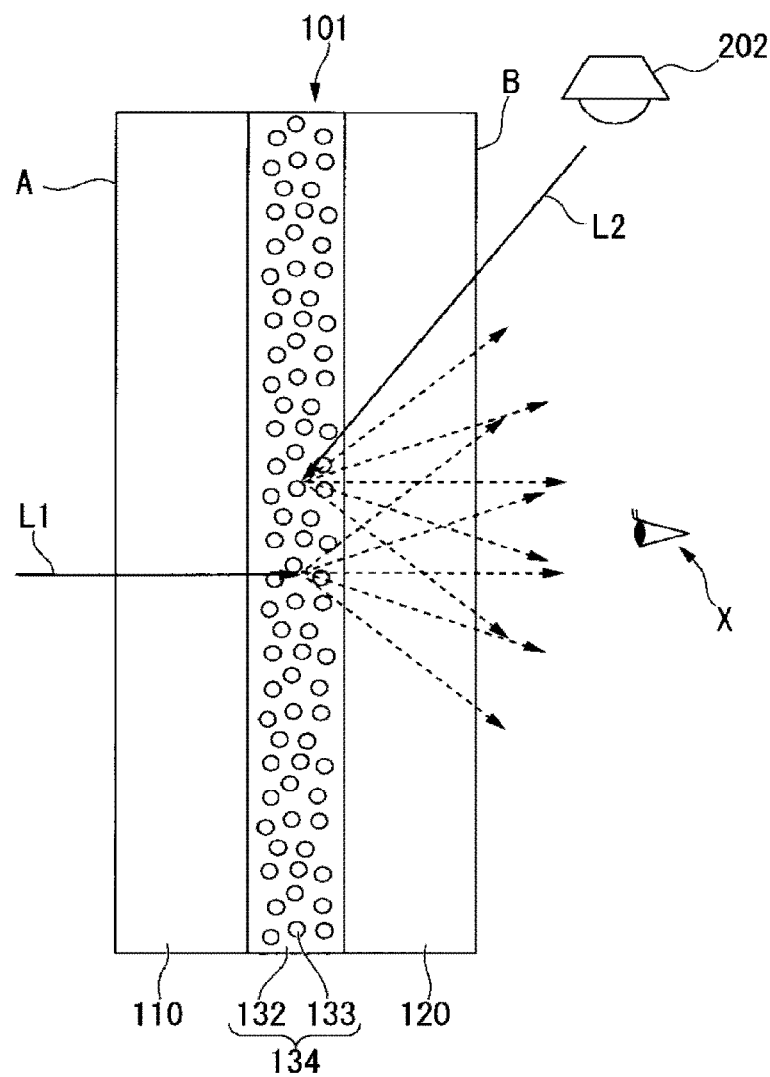
FIG. 18 is a view showing a state where, in the image display system in FIG. 17, no image-forming light is projected to the transmission-type transparent screen from the projector.

The second embodiment of the transmission-type transparent screen may be, as shown in FIG. 16, a screen 2f wherein a first transparent substrate 10 and a second transparent substrate 24 containing a light absorbing material, are bonded via a light absorbing layer 46 using a bonding material as a transparent resin. Likewise, in the light scattering sheet 40, the light absorbing layer 46 may be omitted, and a light absorbing material may be contained in the second transparent film 45.

Further, in the embodiments shown above, the positional relationship between the light absorbing layer and the light scattering layer, or the positional relationship between the light scattering sheet and the transparent substrate may be reversed. Further, as shown in FIGS. 7 and 8, a light scattering material may be localized in the vicinity of the surface of the light scattering layer.

The screens 2a to 2f can be prepared by the same method as the production method of the screens 1a to 2d in the first embodiment, except that the light absorbing layer 46 is added.

For example, in a case where the resin material of the light absorbing layer 46 and the light scattering layer 44, is a cured product of a photocurable resin or a thermosetting resin, it is possible to produce a screen 2a by successively forming a light absorbing layer 46 and a light scattering layer 44 on the transparent substrate 20 surface, and further, it is possible to produce a screen 2a by bonding a transparent substrate 10 to the light scattering layer 44 surface of the screen 2a via a bonding layer 12. Further, in a case where the resin materials for the light-absorbing layer 46, the light scattering layer 44 and the transparent substrate 20 are thermally fusible materials, films to become the respective layers may be produced, and then laminated and fused to produce a screen 2a, or it is also possible to produce a screen 2a by three-layer extrusion molding.

A film or sheet of two-layer structure consisting solely of a light scattering layer and a light-absorbing layer, a film or sheet further having a transparent film layer on one surface or both surfaces thereof (e.g. a sheet of the structure shown in FIG. 14), or the like, may be bonded to e.g. an existing window glass by means of an adhesive or a pressure sensitive adhesive to form a transmission-type transparent screen. Further, relatively thin one among them may be deformed, and thus is suitable for forming a transmission-type transparent screen having a curved surface.

Further, in a double glazing having two glass plates and a frame-like spacer interposed along the peripheral edges of the glass plates so as to form a void space between the glass plates, by bonding the above-mentioned film or sheet on the inner surface of one of the glass plates, it is also possible to form a transmission-type transparent screen.

The present invention is also a sheet or film having a light scattering layer and a light absorbing layer to form such a transmission-type transparent screen. Such a sheet or film may be laminated with a transparent substrate to form a transmission-type transparent screen of the present invention.

EXAMPLES

Now, the present invention will be described in further detail with reference to Examples, but the present invention is not limited to these Examples.

Ex. 2 to 8, 12 and 16 are Examples of the present invention, and Ex. 1, 9, 10, 11, 13 to 15, 17 and 18 are Comparative Examples.

Ex. 1

To 15 g of an UV curable acrylic resin monomer (manufactured by Hitachi Chemical Co., Ltd., Hitaloid (registered trademark) 7981, SP value: 24.0 $(J/cm^3)^{1/2}$, refractive index: 1.52), 15 g of light scattering fine particles (titanium oxide fine particles, average primary particle size: 0.2 μm, refractive index: 2.6) was added, followed by kneading for 10 minutes while degassing, to obtain a light scattering material. Then, to 26 g of the same UV-curable acrylic resin monomer as used for preparing the light scattering material, 1 g of the light scattering material was added to prepare a paste in Ex. 1.

The paste in Ex. 1 was applied to the surface of a transparent polyethylene terephthalate (hereinafter referred to as PET) film (manufactured by Toyobo Co., Ltd., COSMOSHINE (registered trademark) A4300, thickness: 75 μm), and on the paste, another PET film was superimposed. Ultraviolet rays were irradiated to the paste, to cure the ultraviolet curable resin, to form a light scattering layer having a thickness of 20 μm, thereby to obtain a light scattering sheet of Ex. 1.

A soda-lime glass plate (manufactured by Matsunami Glass Ind., Ltd., thickness: 3 mm, Ra: 0.005 μm), a polyvinyl butyral (hereinafter referred to as PVB) film (thickness: 375 μm), the light scattering sheet in Ex. 1, a PVB film (thickness: 375 μm), and a soda-lime glass plate (thickness: 3 mm), were laminated in this order and subjected to vacuum heat-press bonding to obtain a transmission-type transparent screen in Ex. 1. The evaluation results of the transmission-type transparent screen in Ex. 1 are shown in Table 1.

Ex. 2

To 26 g of the same ultraviolet curable resin monomer as used in Ex. 1 (manufactured by Hitachi Chemical Co., Ltd., Hitaloid (registered trademark) 7981, SP value: 24.0 $(J/cm^3)^{1/2}$), 0.12 g of the light scattering material obtained in Ex. 1 (containing titanium oxide fine particles, average primary particle diameter: 0.2 μm, refractive index: 2.6) and 0.13 g (solid content: 0.039 g) of a light-absorbing material (carbon black dispersion in butyl acetate, solid content: 30 mass %, average primary particle size of carbon black: 30 nm) were added, followed by kneading for 10 minutes while degassing to prepare a paste in Ex. 2.

A transmission-type transparent screen in Ex. 2 was obtained in the same manner as in Ex. 1 except that the paste in Ex. 2 was used in place of the paste in Ex. 1. The evaluation results of the transmission-type transparent screen in Ex. 2 are shown in Table 1.

Ex. 3 to 11 and 13 to 15

Transmission-type transparent screens in Ex. 3 to 11 and 13 to 15 were obtained in the same manner as in Ex. 2 except that the amounts of the light scattering material and the light absorbing material were changed to the amounts shown in Table 1. The evaluation results of the transmission-type transparent screens in Ex. 3 to 11 and 13 to 15 are shown in Table 1.

Ex. 12

A transmission-type transparent screen in Ex. 12 was obtained in the same manner as in Ex. 8 except that the light absorbing material was changed to titanium black having an average primary particle size of 90 nm. The evaluation results of the transmission-type transparent screen in Ex. 12 are shown in Table 1.

Ex. 16

To 26 g (solid content: 2.6 g) of a 1-butanol solution of PVB (refractive index: 1.49) (solid content: 10 mass %, SP value: 23.0 $(J/cm^3)^{1/2}$), 0.08 g of a light scattering material (titanium oxide fine particles, average primary particle size: 0.2 µm, refractive index: 2.6) and 0.08 g (solid content: 0.027 g) of a light-absorbing material (butyl acetate dispersion of carbon black, solid content: 30 mass %, average primary particle size: 30 nm) were added, followed by kneading for 10 minutes while degassing, to prepare a paste in Ex. 16.

The paste in Ex. 16 was applied to the surface of a soda-lime glass plate (manufactured by Matsunami Glass Ind., Ltd., thickness: 3 mm, Ra: 0.005 µm) by spin coating (1,000 rpm, 15 seconds), and the paste was dried for 30 minutes at room temperature to form a light scattering layer having a thickness of 10 µm, to obtain a transmission-type transparent screen in Ex. 16. The evaluation results of the transmission-type transparent screen in Ex. 16 shown in Table 1.

Ex. 17

A transmission-type transparent screen in Ex. 15 was obtained in the same manner as in Ex. 1 except that a commercially available light scattering sheet (manufactured by Kimoto, "DILAD Screen" (trade name) film, containing a light scattering material, and not containing a light absorbing material) was used. The evaluation results of the transmission-type transparent screen in Ex. 15 are shown in Table 1.

Ex. 18

A transmission-type transparent screen in Ex. 16 was obtained in the same manner as in Ex. 1 except that a commercially available light scattering sheet (manufactured by Mitsubishi Paper Mills Limited, "SaiVis" (trade name) film, containing a light scattering material and not containing a light absorbing material) was used. The evaluation results of the transmission-type transparent screen in Ex. 16 are shown in Table 1.

Example 19, 23

Transmission-type transparent screens in Ex. 19 and Ex. 23 were obtained in the same manner as in Ex. 2, except that the amounts and particle sizes of the light scattering material and the light absorbing material were changed to the amounts and particle sizes as shown in Table 1. The evaluation results of the transmission-type transparent screens in Ex. 19 and 23 are shown in Table 1.

Ex. 20, 21

Transmission-type transparent screens in Ex. 20 and 21 were obtained in the same manner as in Ex. 2, except that the light absorbing material was changed to a dispersion of carbon black in butyl acetate (solid content: 30 mass %, average primary particle size of carbon black: 24 nm) and the amount was changed to the amount as shown in Table 1. The evaluation results of the transmission-type transparent screens in Ex. 20 and 21 are shown in Table 1.

Ex. 22

A transmission type transparent screen in Ex. 22 was obtained in the same manner as in Ex. 2, except that the light absorbing material was changed to titanium black having an average primary particle size of 75 nm and the amounts of the light scattering material and the light absorbing material were changed to the amounts shown in Table 1. The evaluation results of the transmission-type transparent screen in Ex. 22 are shown in Table 1.

Ex. 24

A transmission type transparent screen in Ex. 24 was obtained in the same manner as in Ex. 2, except that the light absorbing material was changed to small sized titanium oxide (average primary particle size: 24 nm) and the amount was changed to the amount shown in Table 1. The evaluation results of the transmission-type transparent screen in Ex. 24 are shown in Table 1. In a state where image-forming light is projected to the transmission-type transparent screen from the projector installed in a room apart by 1 m from the transmission-type transparent screen in Ex. 24, the image displayed on the transmission-type transparent screen is excellent in visibility although blue color is strong.

TABLE 1

| Ex. | UV curable resin [g] | PVB [g] | Light scattering material [g] | Light absorbing material [g] | Haze [%] | Total light transmittance [%] | Diffuse reflectance [%] | Evaluation |
|---|---|---|---|---|---|---|---|---|
| 1 | 26 | — | 1.00 | — | 77.4 | 51.6 | 10.8 | ×2 |
| 2 | 26 | — | 0.12 | 0.13 | 15.8 | 54.4 | 1.5 | ○ |
| 3 | 26 | — | 0.20 | 0.22 | 25.9 | 37.7 | 1.1 | ○ |
| 4 | 26 | — | 0.17 | 0.19 | 21.0 | 40.6 | 1.0 | ◎ |
| 5 | 26 | — | 0.10 | 0.05 | 14.8 | 70.6 | 1.7 | ○ |
| 6 | 26 | — | 0.07 | 0.13 | 9.5 | 54.9 | 1.2 | ◎ |
| 7 | 26 | — | 0.10 | 0.13 | 14.9 | 54.4 | 1.2 | ◎ |
| 8 | 26 | — | 0.10 | 0.10 | 15.0 | 61.9 | 1.4 | ◎ |
| 9 | 26 | — | 0.21 | 0.07 | 27.8 | 64.3 | 3.8 | Δ2 |
| 10 | 26 | — | 0.30 | 0.35 | 37.8 | 20.8 | 1.7 | Δ2 |
| 11 | 26 | — | 0.10 | — | 13.7 | 84.0 | 2.4 | ○ |
| 12 | 26 | — | 0.10 | 0.10 | 12.0 | 70.3 | 1.7 | ◎ |
| 13 | 26 | — | — | 0.10 | 1.9 | 63.9 | 1.1 | ×1 |
| 14 | 26 | — | — | 1.00 | 8.5 | 10.9 | 0.6 | ×1 |
| 15 | 26 | — | 0.25 | — | 32.9 | 75.6 | 3.9 | ×2 |
| 16 | — | 26 | 0.08 | 0.08 | 15.3 | 61.3 | 2.0 | ◎ |
| 17 | — | — | — | — | 24.4 | 71.2 | 3.1 | Δ2 |
| 18 | — | — | — | — | 21.6 | 82.3 | 4.4 | Δ2 |
| 19 | 26 | — | 0.05 | 0.10 | 7.2 | 61 | 1.2 | Δ1 |
| 20 | 26 | — | 0.10 | 0.10 | 14.9 | 61.1 | 1.3 | ◎ |
| 21 | 26 | — | 0.27 | 0.11 | 33 | 56 | 2.2 | ◎ |

TABLE 1-continued

| Ex. | UV curable resin [g] | PVB [g] | Light scattering material [g] | Light absorbing material [g] | Haze [%] | Total light transmittance [%] | Diffuse reflectance [%] | Evaluation |
|---|---|---|---|---|---|---|---|---|
| 22 | 26 | — | 0.10 | 0.10 | 11 | 72 | 1.7 | ○ |
| 23 | 26 | — | 0.05 | 0.01 | 7 | 81 | 1.5 | Δ1 |
| 24 | 26 | — | 0.10 | 0.10 | 14.3 | 60.5 | 1.3 | ○ |

Evaluation standards in the Table are as follows.

⊚ (excellent): In a room with illuminance of 300 lux, in a state where image-forming light is projected to the transmission-type transparent screen from the projector apart by 1 m, the visibility of the image displayed on the transmission-type transparent screen is further excellent, and in a state where no image-forming light is projected from the projector to the transmission-type transparent screen, the see-through property for the scene of the other side of the transmission-type transparent screen is further excellent.

○ (good): In a room with illuminance of 300 lux, in a state where image-forming light is projected to the transmission-type transparent screen from the projector apart by 1 m, the visibility of the image displayed on the transmission-type transparent screen is excellent, and in a state where no image-forming light is projected from the projector to the transmission-type transparent screen, the see-through property for the scene of the other side of the transmission-type transparent screen is excellent.

Δ1 (average): In a room with illuminance of 300 lux, in a state where image-forming light is projected to the transmission-type transparent screen from the projector apart by 1 m, the visibility of the image displayed on the transmission-type transparent screen is poor.

Δ2 (fair): In a room with illuminance of 300 lux, in a state where no image-forming light is projected from the projector to the transmission-type transparent screen, the see-through property for the scene of the other side of the transmission-type transparent screen is poor.

×1 (bad): In a room with illuminance of 300 lux, in a state where image-forming light is projected to the transmission-type transparent screen from the projector apart by 1 m, no image displayed on the transmission-type transparent screen is visible.

×2 (worse): In a room with illuminance of 300 lux, in a state where no image-forming light is projected from the projector to the transmission-type transparent screen, the scene on the other side of the transmission-type transparent screen cannot be seen through.

INDUSTRIAL APPLICABILITY

The transmission-type transparent screen of the present invention is useful as a transparent member to be used for a showcase for commercial products, etc.; a display case for works of art, etc.; a window for a building, showroom, vehicle, etc.; a glass door; an indoor transparent partition, etc. Specifically, it is useful as a transparent screen, through which a scene on the other side of the transparent member as viewed from an observer can be seen, and which displays image-forming light projected from a projector so as to be visible as a screen image to the observer, at the time of transmitting information such as description of commercial products, etc., states of various types of equipment, destination guides, messages, etc., to the observer, or at the time of displaying e.g. operation scenes of various types of equipment to the observer, or at the time of making the scene of the other side of the transparent member not to be seen through to the observer for the sake of privacy protection, security, etc.

This application is a continuation of PCT Application No. PCT/JP2015/080133, filed on Oct. 26, 2015, which is based upon and claims the benefit of priority from Japanese Patent Application No. 2014-218187 filed on Oct. 27, 2014. The contents of those applications are incorporated herein by reference in their entireties.

REFERENCE SYMBOLS

1: transmission-type transparent screen, 1a: transmission-type transparent screen, 1b: transmission-type transparent screen, 1c: transmission-type transparent screen, 1d: transmission-type transparent screen, 2: transmission-type transparent screen, 2a: transmission-type transparent screen, 2b: transmission-type transparent screen, 2c: transmission-type transparent screen, 2d: transmission-type transparent screen, 2e: transmission-type transparent screen, 2f: transmission-type transparent screen, 10: first transparent substrate, 12: bonding layer, 20: second transparent substrate, 22: bonding layer, 24: second transparent substrate, 30: light scattering sheet, 31: first transparent film, 32: transparent resin, 33: light scattering material, 34: light scattering layer, 35: second transparent film, 40: light scattering sheet, 41: first transparent film, 42: transparent resin, 43: light scattering material, 44: light scattering layer, 45: second transparent film, 46: light absorbing layer, 101: transmission-type transparent screen, 110: first transparent substrate, 120: second transparent substrate, 132: transparent resin, 133: light scattering material, 134: light scattering layer, 200: projector, 202: illumination, A: first surface, B: second surface, L: image-forming light, L1: light, L2: light, X: observer

What is claimed is:

1. A transmission-type transparent screen, comprising:
   a first surface and a second surface on an opposite side thereof; and
   a light scattering layer comprising a transparent resin and a light scattering material,
   wherein the light scattering layer further comprises a light absorbing material,
   and wherein the screen has a haze of from 3 to 30%, a total light transmittance of from 15 to 95%, and a diffuse reflectance of from 0.1 to 2.4%.

2. The transmission-type transparent screen according to claim wherein the haze is from 9 to 30%, and the total light transmittance is from 15 to 84%.

3. The transmission-type transparent screen according to claim 1, wherein the proportion of the light absorbing material is from 0.01 to 5 mass % in 100 mass % of the light scattering layer.

4. The transmission-type transparent screen according to claim 1, wherein the transmission-type transparent screen has a laminated structure comprising 1 or 2 layers of transparent substrate and said light scattering layer, and at least one of said first surface and said second surface is a surface of said transparent substrate.

5. A transmission-type transparent screen, comprising:
a first surface and a second surface on an opposite side thereof;
a light scattering layer comprising a transparent resin and a light scattering material; and
a light absorbing layer comprising a transparent material and a light absorbing material, on the second surface side than said light scattering layer,
wherein
a haze measured with respect to light entered from said first surface side and transmitted to said second surface side, is from 3 to 30%,
a total light transmittance measured with respect to light entered from said first surface side and transmitted to said second surface side, is from 15 to 95%, and
a diffuse reflectance measured with respect to light entered from said second surface side and reflected to said second surface side, is from 0.1 to 2.4%.

6. The transmission-type transparent screen according to claim 5, wherein the haze is from 9 to 30%, and the total light transmittance is from 15 to 84%.

7. The transmission-type transparent screen according to claim 5, wherein the transmission-type transparent screen has a laminated structure comprising 1 or 2 layers of transparent substrate, said light scattering layer and said light absorbing layer, and at least one of said first surface and said second surface is a surface of said transparent substrate.

8. The transmission-type transparent screen according to claim 1, wherein an arithmetic mean roughness Ra at said first surface and said second surface is at most 0.3 μm.

9. The transmission-type transparent screen according to claim 1, wherein a solubility parameter of said transparent resin is at least 18 $(H/cm^3)^{1/2}$.

10. The transmission-type transparent screen according to claim 1, wherein the light scattering material and the light absorbing material are fine particles, and the average primary particle size of the light absorbing material is smaller than the average primary particle size of the light scattering material.

11. The transmission-type transparent screen according to claim 1, wherein an average primary particle size of the light scattering material is at most 1 μm, and the average primary particle size of the light absorbing material is at most 200 nm.

12. The transmission-type transparent screen according to claim 1, wherein a ratio of the average primary particle size of the light absorbing material to the average primary particle size of the light scattering material is (average primary particle size of the light absorbing material)/(average primary particle size of the light scattering material) is from 0.001 to 0.99.

13. An image display system comprising the transmission-type transparent screen according to claim 1, and a projector installed on the first surface side of the transmission-type transparent screen.

14. An image display method, comprising:
projecting image-forming light from a projector installed on the first surface side of the transmission-type transparent screen according to claim 1, to the transmission-type transparent screen, to display an image.

15. A transparent film or sheet which has a light scattering layer made of a transparent resin comprising a light scattering material and an inorganic coloring material, or has a light scattering layer made of a transparent resin comprising a light scattering material, and a light absorbing layer made of a transparent resin comprising an inorganic coloring material, and which is to be laminated with a transparent substrate to form a transmission-type transparent screen.

16. The transparent film or sheet according to claim 15, wherein the proportion of the inorganic coloring material is from 0.01 to 5 mass % in 100 mass % of the light scattering layer.

17. The transparent film or sheet according to claim 15, wherein the inorganic coloring material is a member selected from the group consisting of carbon black and titanium oxide.

* * * * *